(12) United States Patent
Prendki

(10) Patent No.: US 11,055,723 B2
(45) Date of Patent: *Jul. 6, 2021

(54) PERFORMING CUSTOMER SEGMENTATION AND ITEM CATEGORIZATION

(71) Applicant: Walmart Apollo, LLC, Bentonville, AR (US)

(72) Inventor: Jennifer Laetitia Prendki, Mountain View, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/601,175

(22) Filed: Oct. 14, 2019

(65) Prior Publication Data

US 2020/0043014 A1 Feb. 6, 2020

Related U.S. Application Data

(63) Continuation of application No. 15/421,232, filed on Jan. 31, 2017, now Pat. No. 10,445,742.

(51) Int. Cl.
*G06Q 30/00* (2012.01)
*G06Q 30/06* (2012.01)

(52) U.S. Cl.
CPC ......... *G06Q 30/01* (2013.01); *G06Q 30/0631* (2013.01); *G06Q 30/0643* (2013.01)

(58) Field of Classification Search
None
See application file for complete search history.

(56) References Cited

U.S. PATENT DOCUMENTS 7,249,050 B1 7/2007 Walker et al.
7,756,879 B2 7/2010 Parsons et al.
(Continued)

OTHER PUBLICATIONS

"Opera Solutions LLC Seeks Patent for Method and Apparatus for Ordering Recommendations According to a Mean/Variance Tradeoff," (May 9, 2015), Global IP News Information, Technology Patent News Extracted from Dialog Solutions (Year: 2015), https://dialog.proquest.com/professional/printviewfile?accountid=161862, accessed Sep. 9, 2019.

(Continued)

*Primary Examiner* — Mila Airapetian
(74) *Attorney, Agent, or Firm* — Bryan Cave Leighton Paisner LLP

(57) ABSTRACT

A method implemented via execution of computing instructions configured to run at one or more processors and stored at non-transitory computer-readable media. The method can include receiving a respective weighting vector for each of a plurality of users, applying categorization rules on the respective weighting vectors for the plurality of users to categorize the plurality of users into a plurality of subgroups, generating a profile weighting vector for a first subgroup of the plurality of subgroups, and selecting, for the first subgroup, one or more first items from among a plurality of items in a category of items based at least in part on: (a) profile weights of the profile weighting vector for the first subgroup, and (b) sentiment data for features of the plurality of items. The method additionally can include displaying the one or more first items for the first subgroup of the plurality of subgroups. Other embodiments are disclosed.

20 Claims, 19 Drawing Sheets

(56) References Cited

U.S. PATENT DOCUMENTS

| | | |
|---|---|---|
| 8,166,032 B2 | 4/2012 | Sommer et al. |
| 8,417,713 B1 | 4/2013 | Blair-Goldensohn et al. |
| 8,515,828 B1 | 8/2013 | Wolf et al. |
| 8,533,052 B1 | 9/2013 | Rajyaguru et al. |
| 8,856,232 B1 | 10/2014 | Swerdlow et al. |
| 9,134,215 B1 | 9/2015 | Vignisson et al. |
| 9,317,566 B1 | 4/2016 | L'Huillier et al. |
| 9,336,268 B1 | 5/2016 | Moudy et al. |
| 9,495,425 B1 | 11/2016 | Kuznetsov |
| 9,519,910 B2 * | 12/2016 | Palit .................. G06Q 30/0202 |
| 10,410,273 B1 | 9/2019 | Finkelstein et al. |
| 2008/0249764 A1 * | 10/2008 | Huang .................. G06F 40/30 704/9 |
| 2009/0282019 A1 | 11/2009 | Galitsky et al. |
| 2012/0209751 A1 | 8/2012 | Chen et al. |
| 2012/0278127 A1 | 11/2012 | Kirakosyan et al. |
| 2012/0330971 A1 | 12/2012 | Thomas et al. |
| 2013/0290423 A1 | 10/2013 | Bao et al. |
| 2013/0325653 A1 | 12/2013 | Quimet |
| 2014/0129376 A1 | 5/2014 | Kamimaeda et al. |
| 2014/0180793 A1 | 6/2014 | Boal |
| 2015/0088894 A1 | 3/2015 | Czarlinska et al. |
| 2015/0095330 A1 | 4/2015 | Guo et al. |
| 2015/0170038 A1 | 6/2015 | Cheng et al. |
| 2015/0186790 A1 | 7/2015 | Ehlen et al. |
| 2015/0220950 A1 | 8/2015 | Hsiao |
| 2016/0019621 A1 | 1/2016 | Jnagal et al. |
| 2016/0196561 A1 | 7/2016 | Iyer et al. |
| 2016/0217522 A1 | 7/2016 | Jnagal et al. |
| 2016/0267377 A1 | 9/2016 | Pan et al. |
| 2016/0277528 A1 | 9/2016 | Guilaume et al. |
| 2017/0017971 A1 | 1/2017 | Moreau et al. |
| 2017/0132822 A1 | 5/2017 | Marschke et al. |
| 2017/0178256 A1 * | 6/2017 | Albert .................. G06Q 50/06 |
| 2017/0193582 A1 | 7/2017 | Guo et al. |
| 2017/0193585 A1 | 7/2017 | Guo et al. |
| 2017/0206557 A1 | 7/2017 | Abrol et al. |
| 2017/0287044 A1 | 10/2017 | Rose et al. |
| 2017/0330241 A1 | 11/2017 | Bhatt et al. |
| 2018/0047071 A1 | 2/2018 | Hsu et al. |
| 2018/0316972 A1 | 11/2018 | Miyazaki |

OTHER PUBLICATIONS

Dong et al., "Combining Similarity and Sentiment in Opinion Mining for Product Recommendation," Journal of Intelligent Information Systems, vol. 46, pp. 285-312, (2016), https://doi.org/10.1007/s10844-015-0379-y, 2016.

* cited by examiner

FIG. 21

PERFORMING CUSTOMER SEGMENTATION AND ITEM CATEGORIZATION

CROSS-REFERENCE TO RELATED APPLICATIONS

This application is a continuation of U.S. patent application Ser. No. 15/421,232, filed Jan. 31, 2017. U.S. patent application Ser. No. 15/421,232 is incorporated herein by reference in its entirety.

TECHNICAL FIELD

This disclosure relates generally to analysis and use of user-generated post-purchase content.

BACKGROUND

Modern consumers have many choices when selecting products to purchase. After making a purchase online, consumers often take the opportunity to provide post-purchase feedback. User-generated post-purchase content contains valuable information about consumer sentiment toward various aspects of products. Such user-generated post-purchase content is often found in user reviews, return information, social media, etc.

BRIEF DESCRIPTION OF THE DRAWINGS

To facilitate further description of the embodiments, the following drawings are provided in which:

FIG. 21 illustrates a portion of a webpage showing an item results listing for browse results in a "t-shirt women" browse category based on an update to intent weights in a user intent input form, according to another embodiment;

Figure 1:
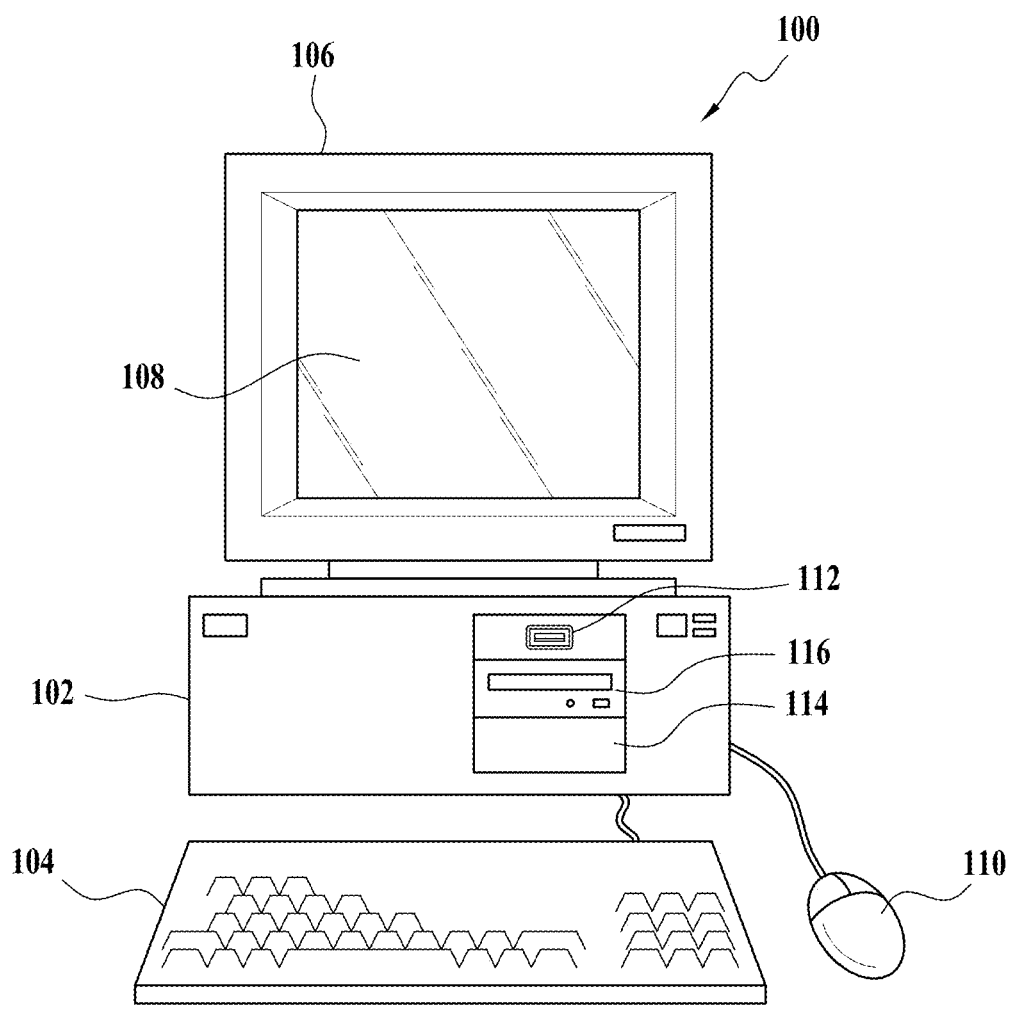
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, one minute, or five minutes.

DESCRIPTION OF EXAMPLES OF EMBODIMENTS

A number of embodiments include a system including one or more processors and one or more non-transitory computer-readable media storing computing instructions configured to run on the one or more processors and perform certain acts. The acts can include generating a weighting vector for a first user. The weighting vector can track a weight corresponding to each feature of a plurality of features. The plurality of features can represent purchasing criteria that are common to each item in a category of items. The acts also can include, in response to receiving a request from the first user to view details for a selected item, recommending to the first user, in real-time after receiving the request, one or more other items that are different from the selected item. The selected item and the one or more other items can be in a category of items that is the same. The plurality of features can be in common for each item in the category of items. Sentiment data can include a sentiment score for each feature for each item in the category of items. The one or more other items can be recommended based on the sentiment score of one or more first features of the plurality of features for each of the one or more other items exceeding the sentiment score of a corresponding one of the one or more first features for the selected item. The acts additionally can include receiving a new request from the first user to view details for a new selected item that is selected from among the one or more other items. The acts further can include updating the weight that corresponds to each of the one or more first features for the new selected item in the weighting vector for the first user.

Various embodiments include a method being implemented via execution of computing instructions configured to run at one or more processors and configured to be stored at non-transitory computer-readable media. The method can include generating a weighting vector for a first user. The weighting vector can track a weight corresponding to each feature of a plurality of features. The plurality of features can represent purchasing criteria that are common to each item in a category of items. The method also can include, in response to receiving a request from the first user to view details for a selected item, recommending to the first user, in real-time after receiving the request, one or more other items that are different from the selected item. The selected item and the one or more other items can be in a category of items that is the same. The plurality of features can be in common for each item in the category of items. Sentiment data can include a sentiment score for each feature for each item in the category of items. The one or more other items can be recommended based on the sentiment score of one or more first features of the plurality of features for each of the one or more other items exceeding the sentiment score of a corresponding one of the one or more first features for the selected item. The method additionally can include receiving a new request from the first user to view details for a new selected item that is selected from among the one or more other items. The method further can include updating the weight that corresponds to each of the one or more first features for the new selected item in the weighting vector for the first user.

Additional embodiments include a system including one or more processors and one or more non-transitory computer-readable media storing computing instructions configured to run on the one or more processors and perform certain acts. The acts can include sending to a first user an input form comprising an input element for an intent weight for each of a plurality of features. The plurality of features can represent purchasing criteria that are common to each item in a category of items. The acts also can include receiving from the first user the intent weights for the plurality of features. Each of the intent weights can represent a level of importance of a different feature of the plurality of features to the first user. The acts additionally can include selecting one or more first items from among a plurality of items in the category of items based at least in part on: (a) the intent weights for the plurality of features for the first user, and (b) sentiment data comprising a sentiment score for each feature for each of the plurality of items. The sentiment scores for the plurality of features for each of the plurality of items can be derived from user-generated post-purchase content about the plurality of items. The acts further can include displaying the one or more first items to the first user in real-time after receiving the intent weights.

Further embodiments include a method being implemented via execution of computing instructions configured to run at one or more processors and configured to be stored at non-transitory computer-readable media. The method can include sending to a first user an input form comprising an input element for an intent weight for each of a plurality of features. The plurality of features can represent purchasing criteria that are common to each item in a category of items. The method also can include receiving from the first user the intent weights for the plurality of features. Each of the intent weights can represent a level of importance of a different feature of the plurality of features to the first user. The method additionally can include selecting one or more first items from among a plurality of items in the category of items based at least in part on: (a) the intent weights for the plurality of features for the first user, and (b) sentiment data comprising a sentiment score for each feature for each of the plurality of items. The sentiment scores for the plurality of features for each of the plurality of items can be derived from user-generated post-purchase content about the plurality of items. The method further can include displaying the one or more first items to the first user in real-time after receiving the intent weights.

Still further embodiments include a system including one or more processors and one or more non-transitory computer-readable media storing computing instructions configured to run on the one or more processors and perform certain acts. The acts can include receiving a weighting vector for each of a plurality of users, the weighting vector tracking a weight corresponding to each feature of a plurality of features. The plurality of features can represent purchasing criteria that are common to each item in a category of items. Each of the weights in the weighting vector for each user of the plurality of users can represent a level of importance of a different feature of the plurality of features to the user. The acts also can include applying categorization rules on the weighting vectors for the plurality of users to categorize the plurality of users into a plurality of subgroups. The acts additionally can include generating a profile weighting vector for each subgroup of the plurality of subgroups. The profile weighting vector can include a profile weight corresponding to each feature of the plurality of features that is based on weights for a corresponding one of the feature in the weighting vectors of users from among the plurality of users that are categorized into the subgroup. The acts further can include selecting, for a first subgroup of the plurality of subgroups, one or more first items from among a plurality of items in the category of items based at least in part on: (a) the profile weights of the profile weighting vector for the first subgroup, and (b) sentiment data comprising a sentiment score for each feature for each of the plurality of items. The sentiment scores for the plurality of features for each of the plurality of items being derived from user-generated post-purchase content about the plurality of items. The acts additionally can include displaying the one or more first items for the first subgroup of the plurality of subgroups.

Additional embodiments include a method being implemented via execution of computing instructions configured to run at one or more processors and configured to be stored at non-transitory computer-readable media. The method can include receiving a weighting vector for each of a plurality of users, the weighting vector tracking a weight corresponding to each feature of a plurality of features. The plurality of features can represent purchasing criteria that are common to each item in a category of items. Each of the weights in the weighting vector for each user of the plurality of users can represent a level of importance of a different feature of the plurality of features to the user. The method also can include applying categorization rules on the weighting vectors for the plurality of users to categorize the plurality of users into a plurality of subgroups. The method additionally can include generating a profile weighting vector for each subgroup of the plurality of subgroups. The profile weighting vector can include a profile weight corresponding to each feature of the plurality of features that is based on weights for a corresponding one of the feature in the weighting vectors of users from among the plurality of users that are categorized into the subgroup. The method further can include selecting, for a first subgroup of the plurality of subgroups, one or more first items from among a plurality of items in the category of items based at least in part on: (a) the profile weights of the profile weighting vector for the first subgroup, and (b) sentiment data comprising a sentiment score for each feature for each of the plurality of items. The sentiment scores for the plurality of features for each of the plurality of items being derived from user-generated post-purchase content about the plurality of items. The method additionally can include displaying the one or more first items for the first subgroup of the plurality of subgroups.

Further embodiments include a system including one or more processors and one or more non-transitory computer-readable media storing computing instructions configured to run on the one or more processors and perform certain acts. The acts can include receiving a respective weighting vector for each of a plurality of users. The acts also can include applying categorization rules on the respective weighting vectors for the plurality of users to categorize the plurality of users into a plurality of subgroups. The acts additionally can include generating a profile weighting vector for a first subgroup of the plurality of subgroups. The acts further can include selecting, for the first subgroup, one or more first items from among a plurality of items in a category of items based at least in part on: (a) profile weights of the profile weighting vector for the first subgroup, and (b) sentiment data for features of the plurality of items. The acts additionally can include displaying the one or more first items for the first subgroup of the plurality of subgroups.

Additional embodiments include a method being implemented via execution of computing instructions configured to run at one or more processors and configured to be stored at non-transitory computer-readable media. The method can include receiving a respective weighting vector for each of a plurality of users. The method also can include applying categorization rules on the respective weighting vectors for the plurality of users to categorize the plurality of users into a plurality of subgroups. The method additionally can include generating a profile weighting vector for a first subgroup of the plurality of subgroups. The method further can include selecting, for the first subgroup, one or more first items from among a plurality of items in a category of items based at least in part on: (a) profile weights of the profile weighting vector for the first subgroup, and (b) sentiment data for features of the plurality of items. The method additionally can include displaying the one or more first items for the first subgroup of the plurality of subgroups.

Figure 2:
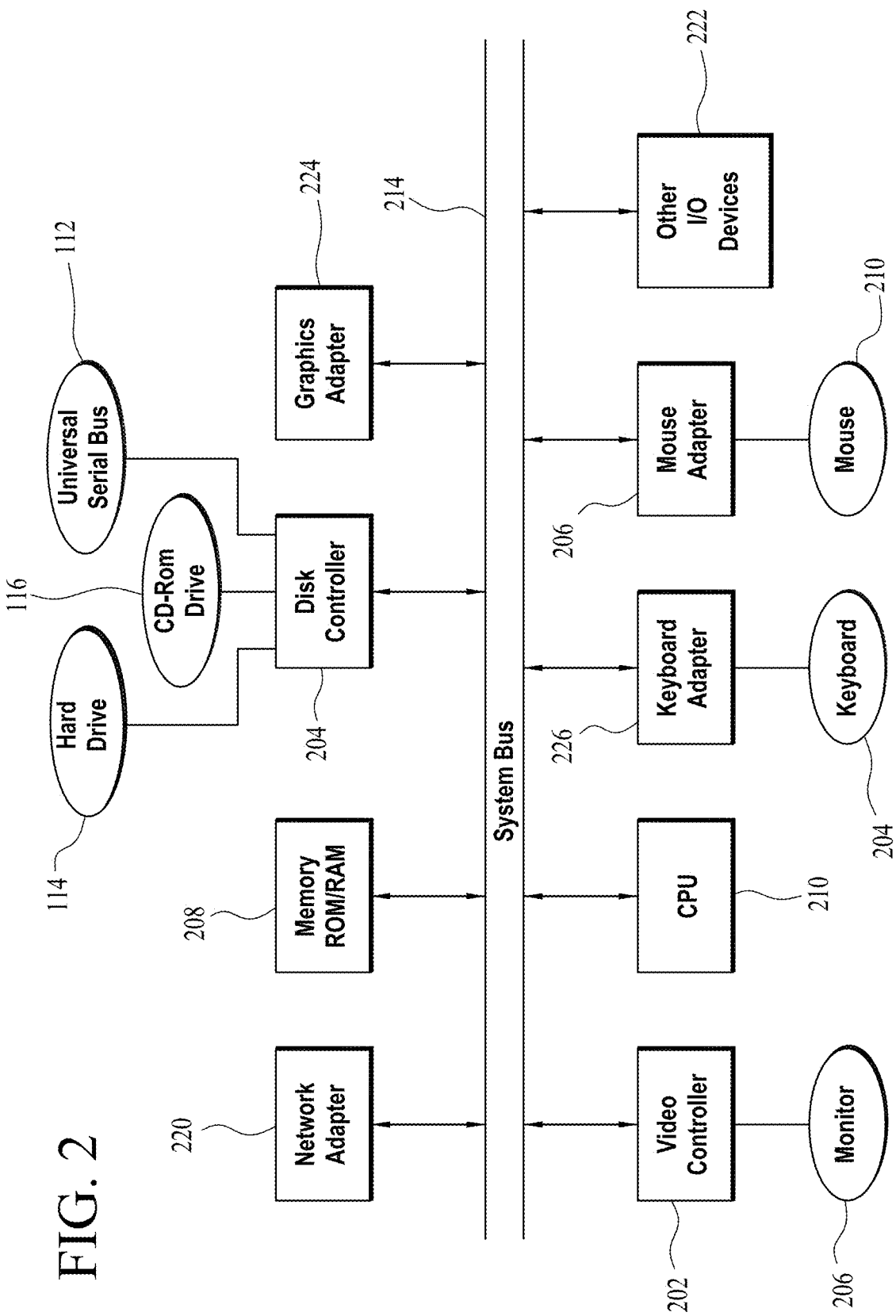
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of a chassis 102 (and its internal components) can be suitable for implementing the techniques described herein. Furthermore, one or more elements of computer system 100 (e.g., a refreshing monitor 106, a keyboard 104, and/or a mouse 110, etc.) can also be appropriate for implementing the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM or DVD drive 116 (FIGS. 1-2). Non-volatile or non-transitory memory storage unit(s) refer to the portions of the memory storage units(s) that are non-volatile (e.g., non-transitory) memory. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can include Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 and the circuit boards inside chassis 102 (FIG. 1) are not discussed herein.

When computer system 100 in FIG. 1 is running, program instructions stored on a USB-equipped electronic device connected to USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smart phone. In certain additional embodiments, computer system 100 may comprise an embedded system.

Figure 3:
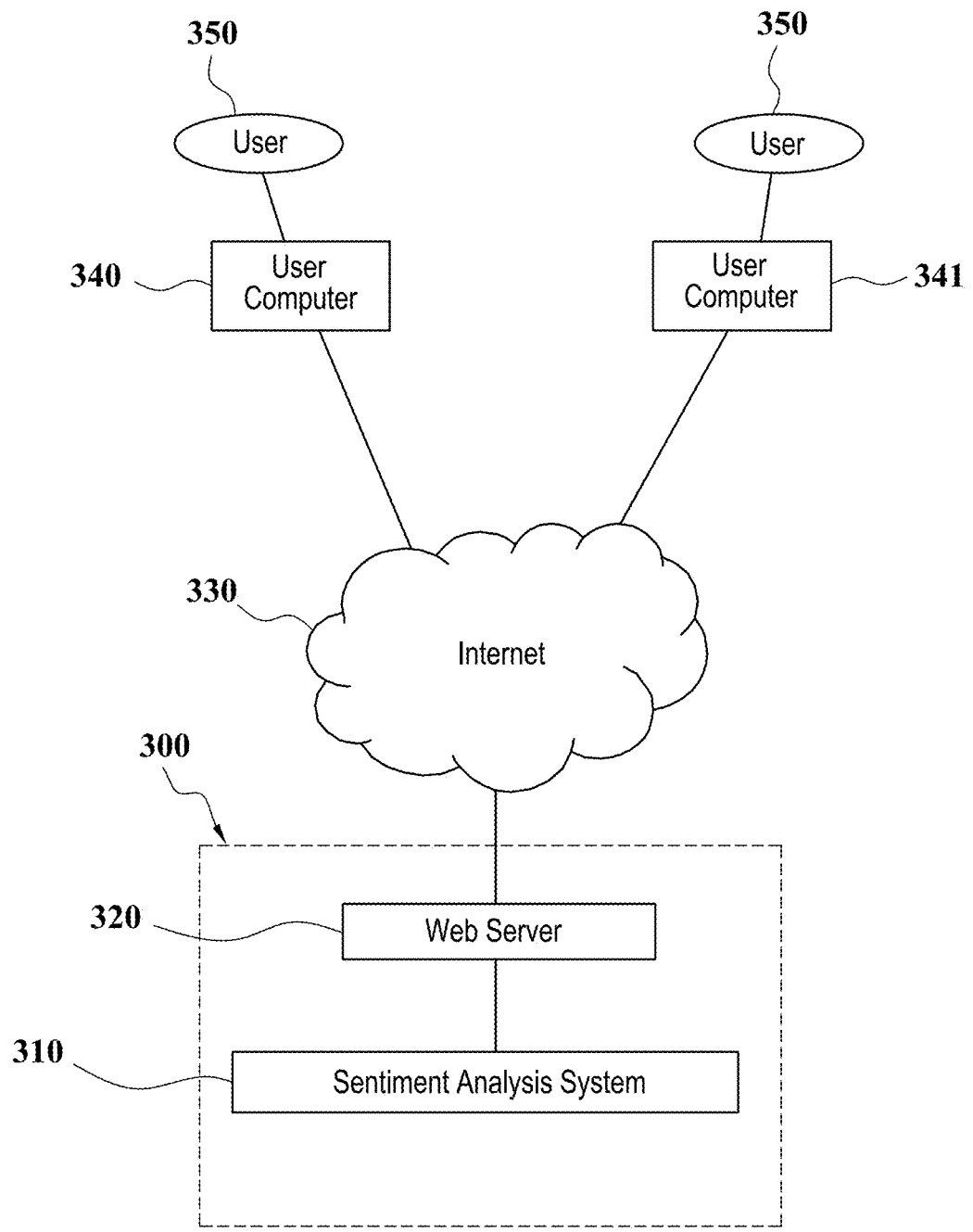
FIG. 3 illustrates a block diagram of a system that can be employed for providing recommendations based on user-generated post-purchase content and navigation patterns, providing recommendations based on user intent and user-generated post-purchase content, and performing customer segmentation and item categorization, according to an embodiment.

Turning ahead in the drawings, FIG. 3 illustrates a block diagram of a system 300 that can be employed for providing recommendations based on user-generated post-purchase content and navigation patterns, providing recommendations based on user intent and user-generated post-purchase content, and/or performing customer segmentation and item categorization, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include a sentiment analysis system 310 and/or a web server 320.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein. Sentiment analysis system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host sentiment analysis system 310 and web server 320. Additional details regarding sentiment analysis system 310 and web server 320 are described herein.

In some embodiments, web server 320 can be in data communication through Internet 330 with one or more user computers, such as user computers 340 and/or 341. In some embodiments, user computers 340-341 can be used by users, such as users 350 and 351, which also can be referred to as customers, in which case, user computers 340 and 341 can be referred to as customer computers. Web server 320 can host one or more websites. For example, web server 320 can host an eCommerce website and/or eCommerce mobile application ("app") that allows users to browse and/or search for products, to add products to an electronic shopping cart, and/or to purchase products, in addition to other suitable activities.

In some embodiments, an internal network that is not open to the public can be used for communications between sentiment analysis system 310 and web server 320 within system 300. Accordingly, in some embodiments, sentiment analysis system 310 (and/or the software used by such systems) can refer to a back end of system 300 operated by an operator and/or administrator of system 300, and web server 320 (and/or the software used by such systems) can refer to a front end of system 300, as is can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 can be desktop computers, laptop computers, a mobile device, and/or other endpoint devices. used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons (N), 17.8 N, 22.3 N, 31.2 N, and/or 44.5 N.

Exemplary mobile devices can include (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can include the Virtual Retinal Display™ product, or similar product by the University of Washington of Seattle, Wash., United States of America. Meanwhile, in further specific examples, a limb mountable wearable user computer device can include the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, sentiment analysis system 310 and/or web server 320 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to sentiment analysis system 310 and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor (s) and/or the memory storage unit(s). In some embodiments, the KVM switch also can be part of sentiment analysis system 310 and/or web server 320. In a similar manner, the processors and/or the non-transitory computer-readable media can be local and/or remote to each other.

Meanwhile, in many embodiments, sentiment analysis system 310 and/or web server 320 also can be configured to communicate with one or more databases. The one or more databases can include a product database that contains information about products, items, or SKUs (stock keeping units) sold by a retailer, for example. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between sentiment analysis system 310 and/or web server 320, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

Figure 4:
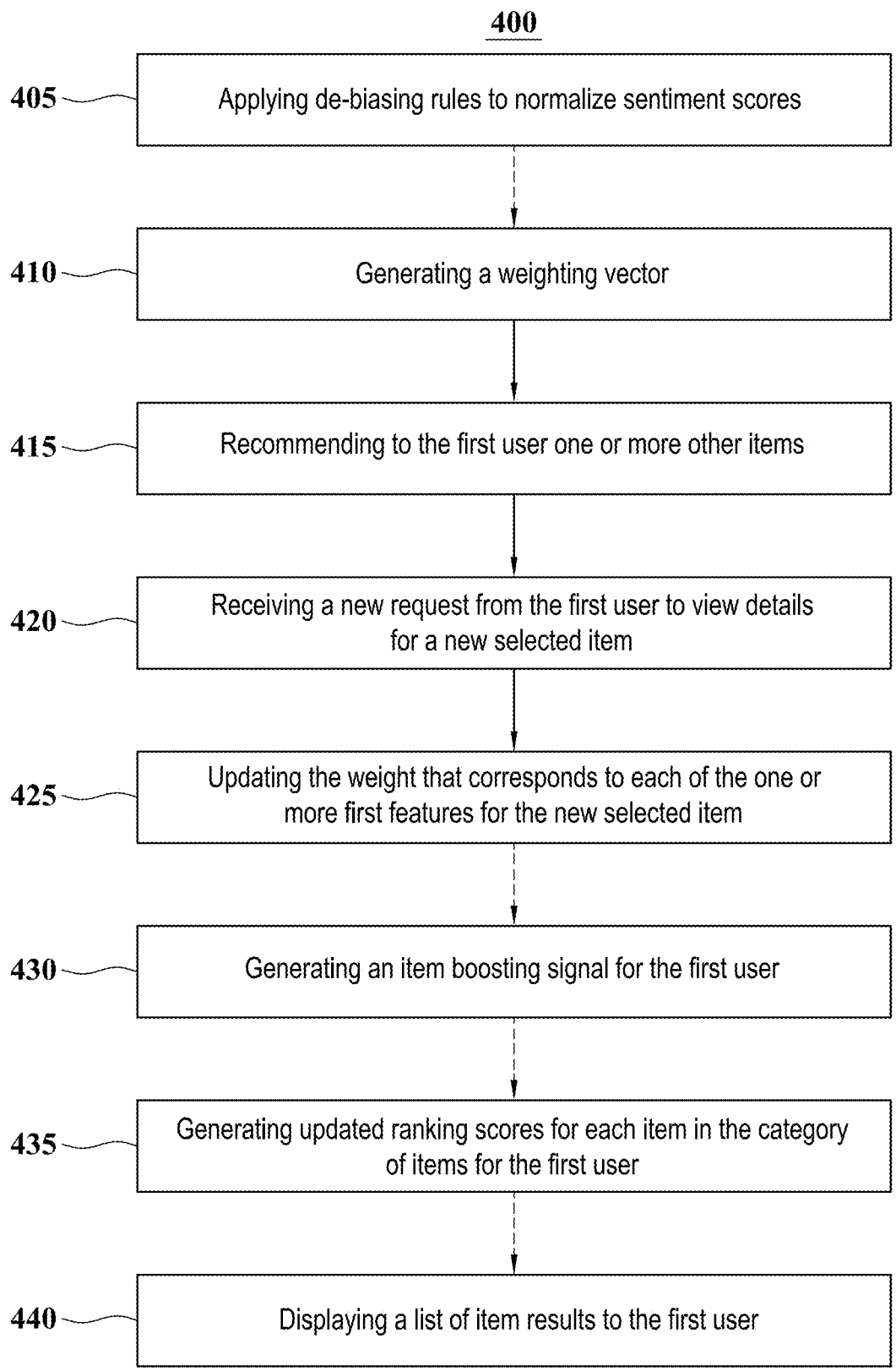
FIG. 4 illustrates a flow chart for a method, according to another embodiment.

Turning ahead in the drawings, FIG. 4 illustrates a flow chart for a method 400. In some embodiments, method 400 can be a method of providing recommendations based on user-generated post-purchase content and navigation patterns. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of a computer system such as sentiment analysis system 310 (FIG. 3) and/or web server 320 (FIG. 3). The processor(s) can be similar or identical to the processor(s) described above with respect to computer system 100 (FIG. 1).

Referring to FIG. 4, method 400 optionally can include a block 405 of applying de-biasing rules to normalize sentiment scores for a plurality of features for items in a category of items. A category of items can be a category in a product taxonomy, a search result category, or another suitable type of category. In many embodiments, block 405 can be performed before block 410 and/or block 415, which are both described below. In many embodiments, the sentiment scores for the plurality of features for items in the category of items can be derived from user-generated post-purchase content about the items.

Figure 5:
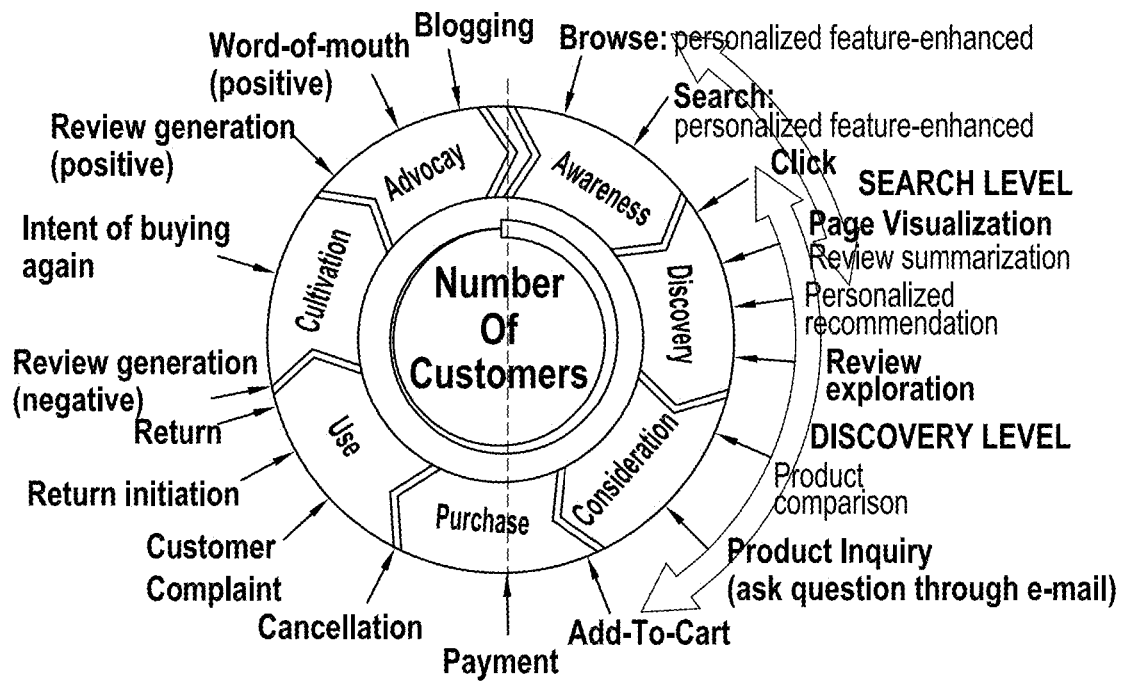
FIG. 5 illustrates a block diagram showing various different aspects of customer experiences in eCommerce.

Turning ahead in the drawings, FIG. 5 illustrates a block diagram showing various different aspects of customer experiences in eCommerce. The customer experience can be described as having seven stages, including awareness, discover, consideration, purchase, use, cultivation, and advocacy. As shown in FIG. 5, these seven stages can represent a progression of the journey of customers through eCommerce experiences. As the stages progress, the number of customers reached diminishes, as shown in the middle between the seven stages. As such, data in the later stages is rare, and thus valuable. At each of the seven stages, an eCommerce retailer has opportunities to interact with the customer, collect data, evaluate the retailer's performance, etc. In some embodiments, the eCommerce retailer is an eCommerce-only retailer, and in other embodiments, the eCommerce retailer also is a brick and mortar retailer.

The vertical line bifurcating each side of FIG. 5 separates pre-purchase stages on the right from post-purchase stages on the left. The purchase stage straddles both sides. In the pre-purchase stages, customers are provided informational input, such as products, search results, recommendations, rankings of products, etc. In the post-purchase stages, customers can provide data output, which can be captured by the eCommerce retailer. By converting post-purchase data to pre-purchase inputs, the seven stages can create a loop, as shown in FIG. 5, which can enhance customer experiences and increase purchasing.

As shown around the seven stages, there are a number of specific events that occur in the customer experience. In the awareness stage, the customer can browse and/or search to become aware of available items. The systems and methods described herein can enhance browsing and/or searching using user-generated post-purchase data and/or personal customer intent/preferences. In the discovery stage, the customer can click on an item to view details of an item on a page (e.g., page visualization), and can explore reviews. The systems and methods described herein can enhance page visualization using summarization of reviews and can provide personalized recommendations. The browse, search, click, and page visualization events can be considered search-level events, as they involve the customer looking for items. In the consideration stage the customer can consider whether to purchase the product, such as by comparing products and/or inquiring about a product, such as by asking a question through email. The click, page visualization, personalized recommendation, review exploration, product comparison, and product inquiry events can be considered discover level events, as they involve the customer learning about specific items.

The purchase stage can include the customer performing an add-to-cart event, paying for the product, and/or canceling purchase of the product. The use stage can include customer complaints, return initiation, and return events. The cultivation stage can include review generation of negative reviews, and the customer intending to buy again. The advocacy stage can include review generation of positive reviews, word-of-mouth of positive sharing, and/or blogging. The events of cancellation, customer complaint, return initiation, return, and negative review generation are destructive events that can limit future purchases of the products involved. To close the loop of converting post-purchase data to pre-purchase inputs that facilitate additional purchasing, relevant events can include positive review generation, positive word-of-mount, blogging, browse, search, click, page visualization, add-to-cart, and payment.

In many embodiments, user-generated post-purchase data can include many forms of data created by customers in the post-purchase stages. For example, user-generated post-purchase data can include customer ratings, customer reviews, return information, return forms (e.g., return surveys), blog postings, social media postings, feedback to seller (e.g., email to third-party seller and/or supplied sent through eCommerce website/app), voice-of-the customer feedback, chatbot entries, phone sentiment analysis scores, and/or other suitable forms of customer feedback about products. In some embodiments, user-generated post-purchase data can be obtained through customers of the eCommerce retailer. In the same or other embodiments, user-generated post-purchase data can include information about the products available on other platforms, such as posted on websites of other eCommerce retailers, for example. In several embodiments, the user-generated post-purchase data can provide helpful insight into what customers generally think about products, and this insight can be used to provide a better purchasing experience for future customers.

Figure 6:
FIG. 6 illustrates aspects related to analyzing user-generated post-purchase data, including a features list, a selected features list, an item, and a sentiment summarization module.
Figure 6:
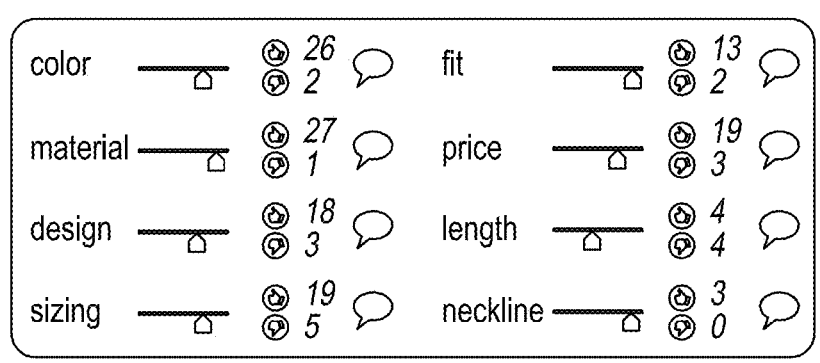

Proceeding to the next drawing, FIG. 6 illustrates aspects related to analyzing user-generated post-purchase data, including a features list 610, a selected features list 620, an item 630, and a sentiment summarization module 640. In many embodiments, a plurality of features can represent purchasing criteria that customer provide feedback about that is common for each item (or most items) in a category of items. In many embodiments, the items can be products that are sold by the eCommerce retailer, but the term item also can include non-physical goods, virtual goods, services, online video portals, travel options, hotel/vacation rentals, events, etc. As used herein, "features" can be different from typical product attributes (or "facets") in that features can be customer-centric criteria. For example, in a category of laptop computers, a common facet can be CPU type, which is a technical term. Features, by contrast, can be high-level criteria that customers consider in purchasing a laptop computer. For example, instead of the facet of "CPU type," a similar feature can be "performance." In customer feedback, the reviews of laptop computers often describe the performance of the laptop and whether the performance is good or bad. Accordingly, each category of item can have features that are relevant to the items in that category of items.

As shown in FIG. 6, an item 630 can show a particular women's t-shirt, specifically, a "Hanes® Women's X-temp Short Sleeve V-neck T-Shirt." Item 630 can be in a category of items, such as "women's t-shirts." Features for this category of "women's t-shirts" can include the features listed in features list 610, namely, color, material, design, sizing, fit, price, length, and neckline, for example. In other categories, the features can be different. For certain items within a category of items, certain features can be more relevant than other features. Selected features list 620 shows a selection of color, design, and neckline as features that are selected as being important than the other features for a particular item, such as item 630. The determination of features used for items in a category of items and/or the selection of features that are more relevant and/or important for certain products can be performed and/or obtained using conventional method or techniques. Sentiment summarization module 640 can include a list of the features for an item, as well as metrics for each feature that quantify the sentiments expressed in user-generated post-purchase data for the item. For example, sentiment summarization module 640 can provide metrics for item 630.

Figure 7:
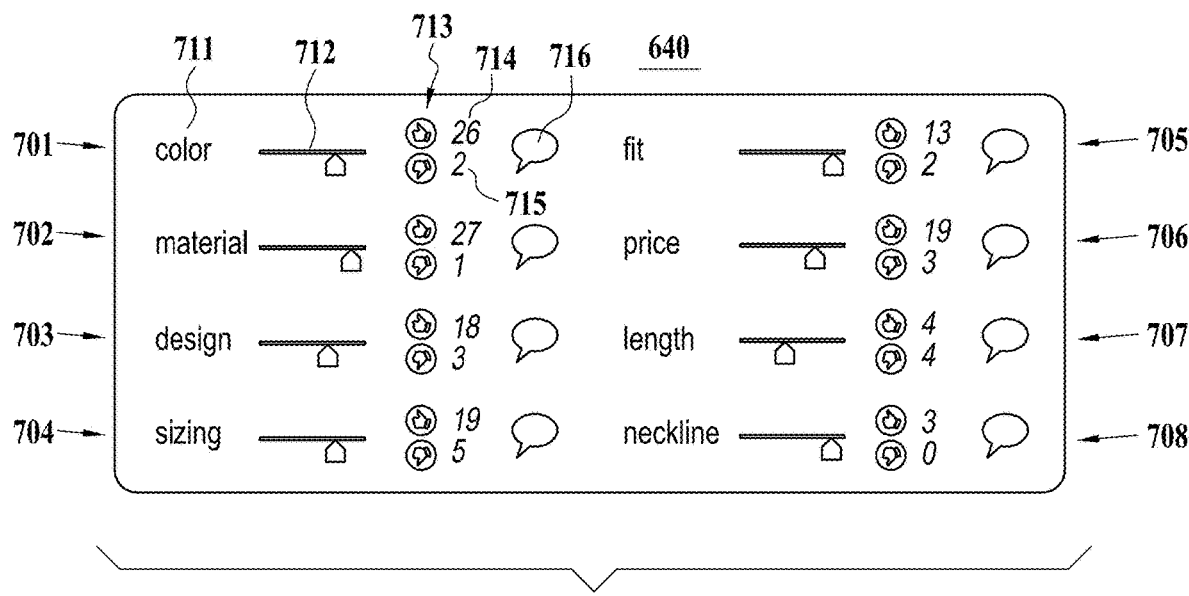
FIG. 7 illustrates a display of the sentiment summarization module of FIG. 6.

Turning ahead in the drawings, FIG. 7 illustrates a display of sentiment summarization module 640. Sentiment summarization module 640 is merely exemplary, and the sentiment summarization module can be employed in many different embodiments or examples not specifically depicted or described herein. In many embodiments, sentiment summarization module can be displayed in a webpage and/or an application, such as a webpage and/or an app hosted by web server 320 (FIG. 3). For example, when a user (e.g., 351-351 (FIG. 3)) selects an item from among items listed in search results or category browsing results, an item page can be displayed that shows information about the item, such as a name of the item (e.g., "Hanes® Women's X-temp Short Sleeve V-neck T-Shirt"), a description of the item, a price of the item, and/or other suitable information. In conventional item pages, customer rating information is often included (e.g., average customer rating of 4 stars out of 5, or a bar graph showing the number of customer ratings in each category). In a number of embodiments, sentiment summarization module 640 can be included in a webpage and/or app in place of or in addition to customer rating information.

In many embodiments, sentiment summarization module 640 can include a sentiment summarization unit, such as sentiment summarization feature units 701-708, for each of the features. In a number of embodiments, sentiment summarization feature units (e.g., 701-708) can each include information for a specific feature, which can be different for each feature. For example, sentiment summarization feature unit 701 can include a feature name 711, such as "color," a sentiment score 712, review statistics 713, and a customer reviews link 716. The customer reviews link can be a link to customer reviews for the item that are related to the feature of color. The customer review statistics can include positive review statistics 714 and/or negative review statistics 715 relating to the feature. For example, positive review statistics 714 can include the number of reviews that approved of the color of the item, and/or negative review statistics 715 can include the number of reviews that were critical of the color of the item.

In many embodiments, sentiment scores 712 and/or review statistics 713 can be calculated using conventional methods. For example, an open-source library called vaderSentiment can be used, which performs the following algorithm:

```
for each reviewed product:
    for each review:
        for each sentence within review:
            compute sentiment score
            for each feature:
                if sentence contains feature or synonym:
                    sentiment(product, review, feature) ←
                        score
        average sentiment over sentences(reviews(product))
    for each feature:
        average sentiments over reviews(product)
        count number of reviews with positive, neutral, and
            negative sentiment over reviews(product)
```

For example, reviews about item 630 (FIG. 6) can refer to the feature of neckline using various different terms in the customer reviews, such as neckline, v-neck, high neck, scoop, decolletage, low-cut, etc., and each of these terms can be used to assess sentiment for the neckline feature. Although features are common across a category of items, in some cases, not all features will be relevant to certain specific items in a category. In many embodiments, in such cases, no value will be computed and the feature will not be displayed as a sentiment summary feature unit in sentiment summarization module 640. Further, although the customer reviews are mentioned as the source as user-generated post-purchase content, sentiment module 640 can reflect sentiment information from other forms of user-generated post-purchase content.

In some embodiments, the sentiment scores (e.g., 712) can be a raw sentiment score, which can be an average of praise and criticism from user-generated post-purchase content, in which the minimum possible score is the highest criticism and the maximum possible score is the highest praise. In other embodiments, the sentiment scores (e.g., 712) can be normalized by applying di-biasing rules, which can beneficially remove biases that often exist in user-generated post-purchase content. Sentiment scores are often quite sensitive to bias. These biases are often due to customer incentivization, malicious or voluntary attempts to influence the market one way or another, or due to the effects of the normal feedback loop in which items with bad reviews are not purchase by new customers and therefore items with more reviews tend to have better average ratings.

Figure 8:
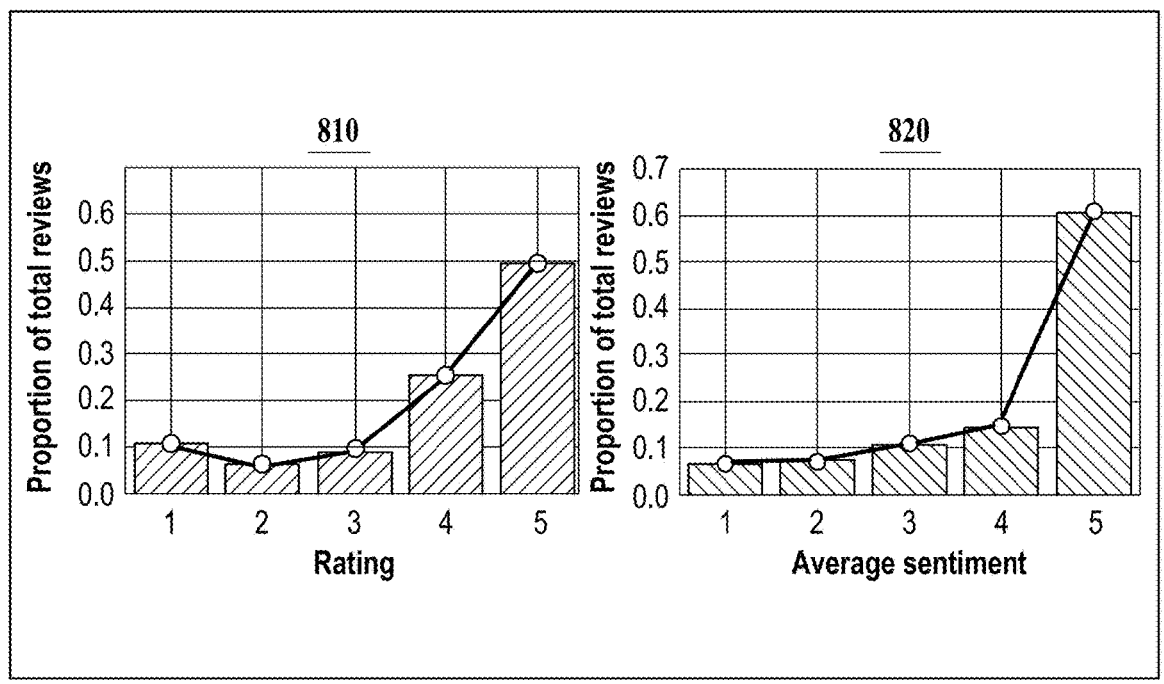
FIG. 8 illustrates a first graph showing a proportion of reviews for each customer rating and a second graph showing a portion of reviews for each average sentiment.

Proceeding to the next drawing, FIG. 8 illustrates a graph 810 showing a proportion of reviews for each customer rating and a graph 820 showing a proportion of reviews for each average sentiment. Specifically graph 810 shows the proportion of all reviews having a customer rating of each possible score from 1 (lowest) to 5 (highest) (e.g., a star rating). Graph 820, shows the proportion of all reviews having an average sentiment corresponding to a customer rating of each possible score from 1 (lowest) to 5 (highest). As shown in FIG. 8, the proportion of total reviews having an average sentiment corresponding to a customer rating of 5 is greater than 0.6 (or 60%), but the proportion of total reviews having a customer rating of 5 is less than 0.5 (or 50%). In other words, customer ratings generally are lower than the sentiments expressed in the customer reviews, showing a misalignment between customer ratings and sentiment.

Figure 9:
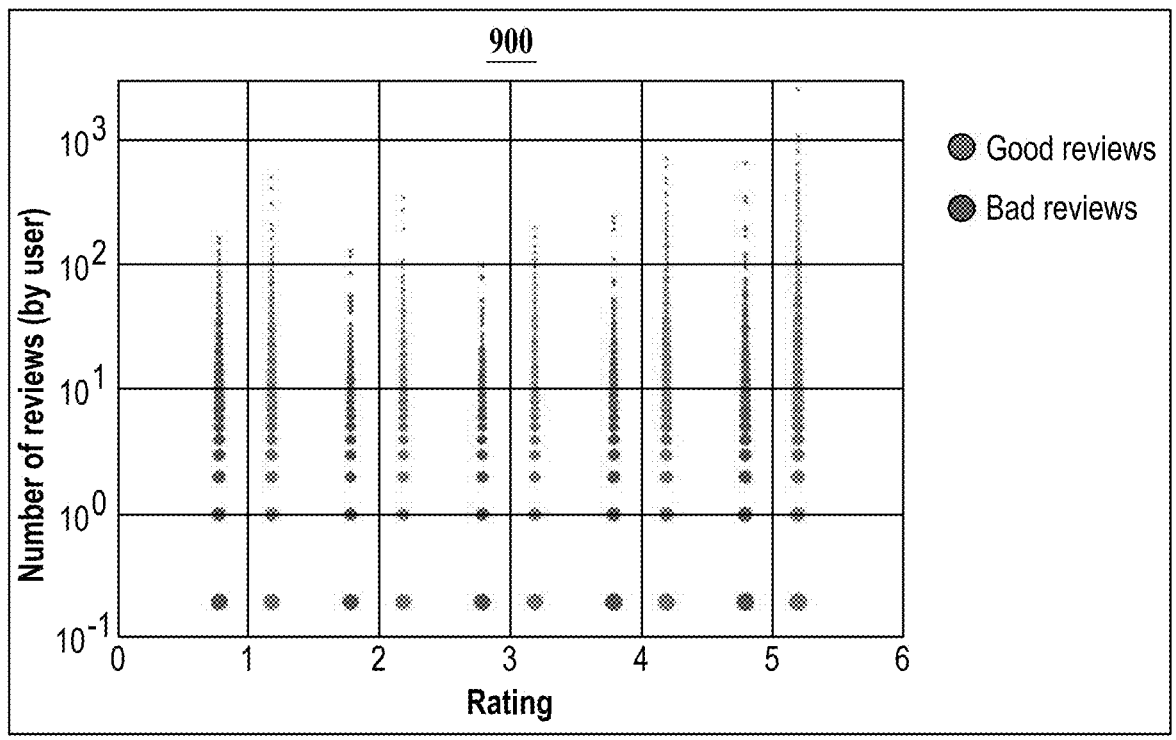
FIG. 9 illustrates a graph showing a number of previous reviews by user for each customer rating.

Turning ahead in the drawings, FIG. 9 illustrates a graph 900 showing a number of previous reviews by user for each customer rating, with the number of bad reviews being shown just to the left of the line for each customer rating and the number of good reviews being shown just to the right of the line for each customer rating. The size of each dot in graph 900 at each of customer rating and number of past reviews corresponds to the relative number of users providing that customer rating that previously provided that number of reviews of the type shown (good or bad). Graph 900 shows that, in general, customer ratings are correlated to a history of past reviews, such that users providing more good reviews in the past are likely to provide a high customer rating.

Figure 10:
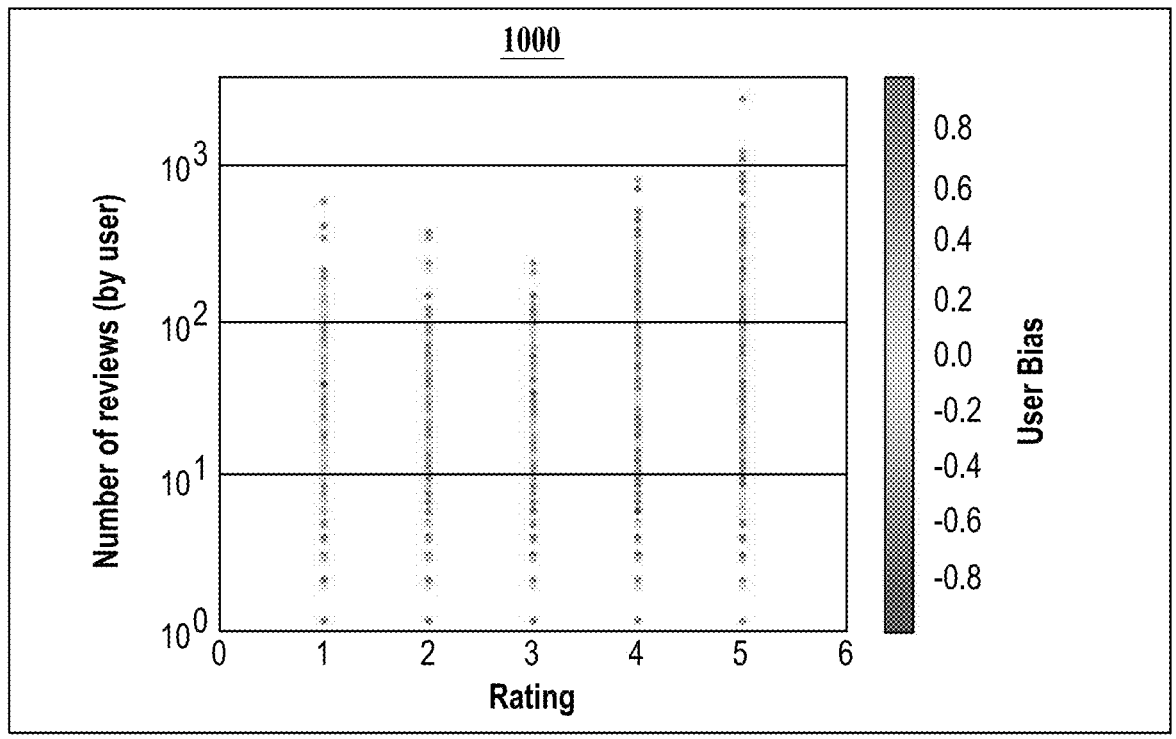
FIG. 10 illustrates a graph showing a number of previous reviews by user for each customer rating, and showing user bias for each such combination.

Proceeding to the next drawing, FIG. 10 illustrates a graph 1000 showing a number of previous reviews by user for each customer rating, and showing user bias for each such combination. The user bias for a user can be calculated as follows:

$$\text{user bias} = \frac{n(pos) - n(neg)}{n(pos) + n(neg)}$$

where n(pos) is the number of prior good reviews, n(neg) is the number of prior bad reviews. Graph 900 shows that most reviews are biased positively, and that customer rating is correlated to prior reviews, as there are more negatively biased reviewers (based on prior reviews) that gave lower customer ratings than higher customer ratings.

Figure 11:
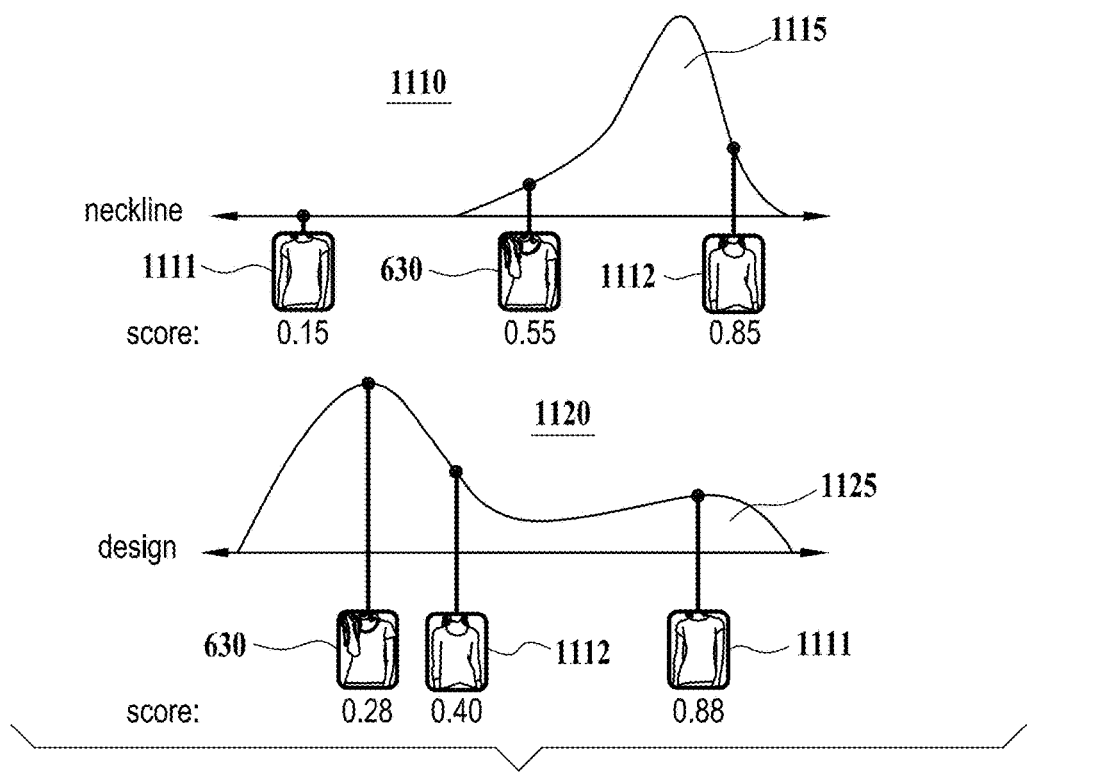
FIG. 11 illustrates a first graph showing a distribution of sentiments scores for items in the "women's t-shirts" category, as well as item-specific sentiment scores for certain items for the feature of neckline, and a second graph showing a distribution of sentiment scores for items in the "women's t-shirts" category, as well as item-specific sentiment scores for the feature of design.

Turning ahead in the drawings, FIG. 11 illustrates a graph 1110 showing a distribution of sentiments scores 1115 for items in the "women's t-shirts" category, as well as item-specific sentiment scores for item 630, an item 1111, and an item 1112, for the feature of neckline, and a graph 1120 showing a distribution of sentiment scores 1125 for items in the "women's t-shirts" category, as well as item-specific sentiment scores for item 630, item 1111, and item 1112, for the feature of design. In each of graphs 1110 and 1120, the sentiment scores have a minimum possible score of 0 and a maximum possible score of 1. Specifically, as shown in graph 1110, for the neckline feature, item 630 has a raw score of 0.55, item 1111 has a raw score of 0.15, and item 1112 has a raw score of 0.85. Although the raw score of 0.55 for item 630 is close to the middle of 0 and 1, distribution of sentiment scores 1115 is biased positively, so that the sentiment score for neckline for item 630 is actually worse than most other items in the category of "women's t-shirts." As shown in graph 1120, for the design feature, item 630 has a raw score of 0.28, item 1111 has a raw score of 0.88, and item 1112 has a raw score of 0.40. Although the raw score of 0.28 for item 630 is fairly low on the scale of 0 and 1, distribution of sentiment scores 1125 is biased negatively, so that the sentiment score for design for item 630 is actually still higher than many other items in the category of "women's t-shirts."

Figure 12:
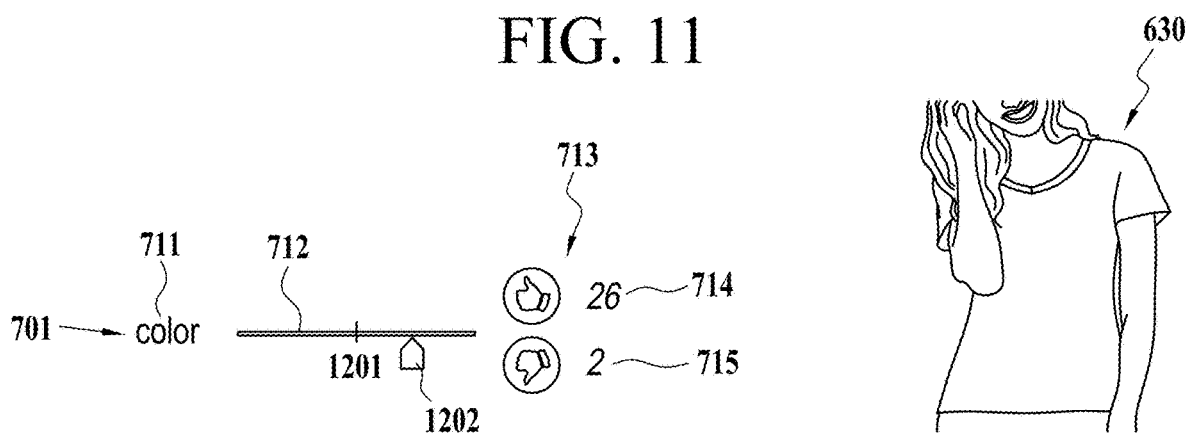
FIG. 12 illustrates aspects related to analyzing user-generated post-purchase data, including the item of FIG. 6, the sentiment summarization module of FIG. 6, and a portion of one of the sentiment summarization feature units of FIG. 7, showing both a raw sentiment score and a normalized sentiment score for the feature of color.

Proceeding to the next drawing, FIG. 12 illustrates aspects related to analyzing user-generated post-purchase data, including item 630, sentiment summarization module 640, and a portion of sentiment summarization feature unit 701, showing both a raw sentiment score 1201 and a normalized sentiment score 1202 for the feature of color. For the feature of color, raw sentiment score 1201 is 0.5, but normalized sentiment score 1202 is 0.7. In many embodiments, the de-biasing rules can apply a normalization that compares the raw sentiment score of the item to the other items in the category. In other words, the raw sentiment score for a feature can be normalized by comparing how the raw sentiment score compares to other items in the same category of items for the same feature. For the example shown in FIG. 12, raw sentiment score 1201 is 0.5 and is higher than 0.7 (or 70%) of the sentiment scores for the other items in the category (e.g., women's t-shirts) for the feature of color, so the normalized sentiment score is 0.7. By normalizing the sentiment scores, the sentiment scores can beneficially be remove the bias that is often prevalent in sentiment scores.

Sentiment summarization module 640 can show the normalized sentiment scores, sentiment summarization module 640 can beneficially convey sentiment information in a way that reflects relative strengths and weaknesses of different features of item 630. For example, because the slider for the sentiment score (e.g., 712) of the length feature is lower than the sentiment scores for the other features, sentiment summarization module 640 shows that length is a relative weakness of item 630. Sentiment summarization module 640 can thus advantageously provide valuable information about areas of strength and weakness for an item as perceived by customers who have already purchased the item. The sentiment data for the features across the item in the category of items can beneficially be used to more accurately recommend products to customers or rank products in search and/or browsing results. After normalization, the sentiment data can allow a user (e.g., 350-351 (FIG. 3)) to review sentiment summarization module 640 can get a good understanding of how customer who purchased the item feel about various aspects of the item without having to read the customer reviews or other user-generated post-purchase data.

Figure 13:
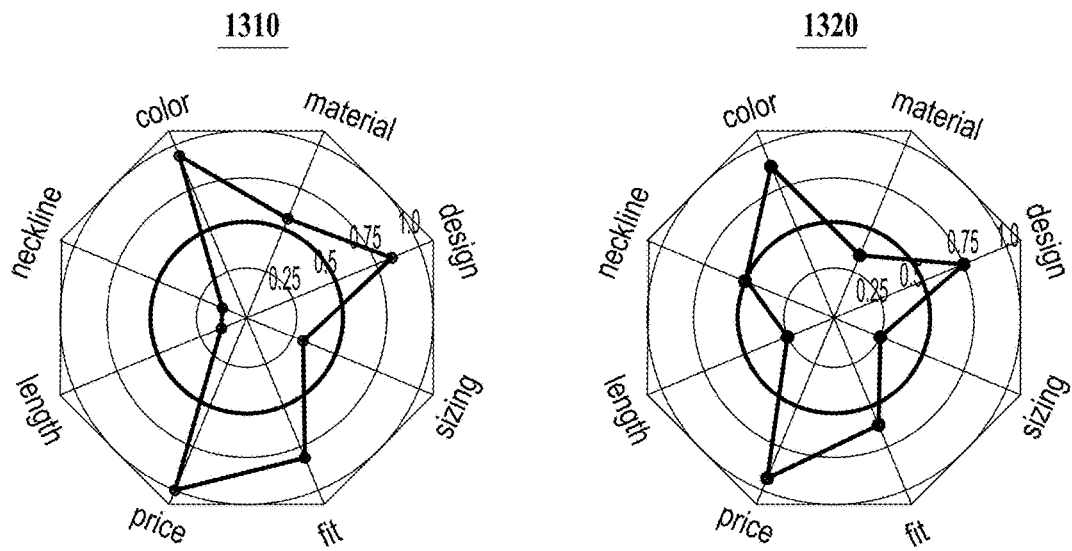
FIG. 13 illustrates a first radar chart showing product weaknesses based on raw sentiment scores for the item of FIG. 6, and a second radar chart showing product weaknesses based on normalized sentiment scores for the item of FIG. 6.

Turning ahead in the drawings, FIG. 13 illustrates a radar chart 1310 showing product weaknesses based on raw sentiment scores for item 630 (FIG. 6), and a radar chart 1320 showing product weaknesses based on normalized sentiment scores for item 630 (FIG. 6). The sentiment scores below 0.5 in radar chart 1310 are for the neckline, length, and sizing features. After de-biasing the sentiment scores to obtain normalized sentiment scores, the sentiment scores below 0.5 in radar chart 1320 are for the length, material, and sizing features. The normalized scoring thus provides robustness against biases, including language biases, inter-category biases, and other forms of biases, on a feature-by-feature basis by comparing the features across the items in the category of items.

Returning to FIG. 4, block 405 of applying de-biasing rules to normalize sentiment scores for a plurality of features for items in a category of items can be performed to normalized the sentiment scores, as explained above and shown in FIGS. 12-13.

In several embodiments, as shown in FIG. 4, method 400 also can include a block 410 of generating a weighting vector for a first user. The first user can be similar or identical to users 350-351 (FIG. 3). In many embodiments, the weighting vector can track a weight corresponding to each feature of the plurality of features in a category of items. For example, for the first user, a weighting vector, $\vec{w}$, can be defined to store weights for the features, such as color, material, design, sizing, fit, price, length, and neckline. When first generated, in some embodiments, the weighting vector can be initialized to all zeros for each element, which can indicate that the user has not yet expressed an intent/preference toward any of the features and is considered as neutral as to all of the features in the category.

In many embodiments, there can be a weighting vector for each user in the category of items. In some embodiments, the weighting vector can represent an importance of the feature to the user in the category of items. The weights can be different than sentiment scores. As described above, sentiment scores can be based on user-generated post-purchase data and are aggregated across many different customers who have purchased the item. By contrast, weights in the weighting vector can represent a personalized intent/preference for a particular user, such as the first user. This personalized intent/preference can be obtained from actions of the user, such as navigation patterns and/or or express intent input, for example.

In a number of embodiments, method 400 additionally can include a block 415 of, in response to receiving a request from the first user to view details for a selected item, recommending to the first user, in real-time after receiving the request, one or more other items that are different from the selected item. In many embodiments, the request can be received from the first user "clicking" on the selected item in a search results or browsing results listing of items, or by clicking on the selected item chosen from among one or more recommended items, for example. In several embodiments, the selected item can be displayed in an item page, which can show details about the selected item. In many embodiments, the one or more other items that are recommended to the first user can be recommended as a portion of the item page. In other embodiments, the one or more other items can be recommended to the first user after the first user has spent a predetermined amount of time (e.g., 30 seconds, 1 minute, 2 minutes, 3 minutes, 4 minutes, or 5 minutes, or another suitable amount of time) on the item page for the selected item without making a purchase or add-to-cart action. In further embodiments, the one or more other items can be recommended to the first user when the user navigates away from the item page for the selected item. By waiting to make a purchase or add-to-cart action, or navigating away from the item, the first user can indicate that there is an aspect of the item that the first user does not like. The one or more other items can thus be recommended to help the user find one or more items that improve upon the aspect that the first user does not like in the selected item.

In some embodiments, the selected item and the one or more other items can be in a category of items that is the same. In many embodiments, the plurality of features can be in common for each item in the category of items. In a number of embodiments, the sentiment data can include a sentiment score for each feature for each item in the category of items.

In several embodiments, the one or more other items can be recommended based on the sentiment score of one or more first features of the plurality of features for each of the one or more other items exceeding the sentiment score of a corresponding one of the one or more first features for the selected item. In some embodiments, the one or more first features of the plurality of features can be different for each of the one or more other items. In other embodiments, the one or more first features of the plurality of features can be the same for at least one feature for two or more of the one or more other items. For example, as shown in radar graph 1320 of FIG. 13, the sentiment score for the sizing feature is 0.25. One or more other items can be recommended that have a sentiment score for the sizing feature that is higher than 0.25, which is the sentiment score for the sizing feature for the selected item.

In many embodiments, the one or more other items can be recommended only when the sentiment score for each of one or more first features of the plurality of features for the selected item is below a first predetermined threshold. For example, the first predetermined threshold can be 0.20, 0.25, 0.30, 0.0.35, 0.40, 0.45, 0.50, 0.55, 0.60, or another suitable threshold. As shown in FIG. 13, if the first predetermined threshold is set to 0.5, there are three features, namely length, sizing, and material, which are below the first predetermined threshold. In such embodiments for this example, the one or more other items can be items that have sentiment scores for those three features (e.g., length, sizing, and material) that exceed the sentiment scores of the selected item. By focusing on the features that are below the first predetermined threshold, the weaknesses of the selected item can beneficially be identified, so that the one or more recommended items help to address the weaknesses of the selected item. The reason why the first user is not purchasing the selected item is likely due to one of these low-scoring features (e.g., features below the first predetermined threshold), so finding products that address one or more of these low-scoring features can address the concerns of the first user. In other embodiments, the first predetermined threshold can be a percentage of the sentiment score for the highest scoring feature, a percentage of an average of the sentiment scores for the features, or a number of features (e.g., the n features with the lowest scores, in which n is a predetermined number (e.g., 2, 3, 4, or 5, for example), or a percentage of the number of features for the selected item.

In a number of embodiments, the one or more other items can be recommended only when a similarity score for the selected items and each of the one or more other items exceeds a second predetermined threshold. In many embodiments, similarity can be determined through content similarities, such as similar titles, descriptions, pictures, review content, attribute values (e.g., color, sleeve length, gender, brand, etc.), user engagement data (e.g., impressions, clicks, add-to-carts, orders, etc.), a combination thereof, and/or other suitable data, such as other behavior data. A similarity score can be used to measure similarities between items, such as the selected item and each of the one or more other items. A conventional similar score metric can be used, and the second predetermined threshold can be set according to the metric that is used. For example, a similarity score metric can determine how similar the titles of the items are, on a scale of 1 to 10, with 1 being completely different and 10 being identical, and the second predetermined threshold can be set to 7 to capture items with similarities scores above 7.

Figure 14:
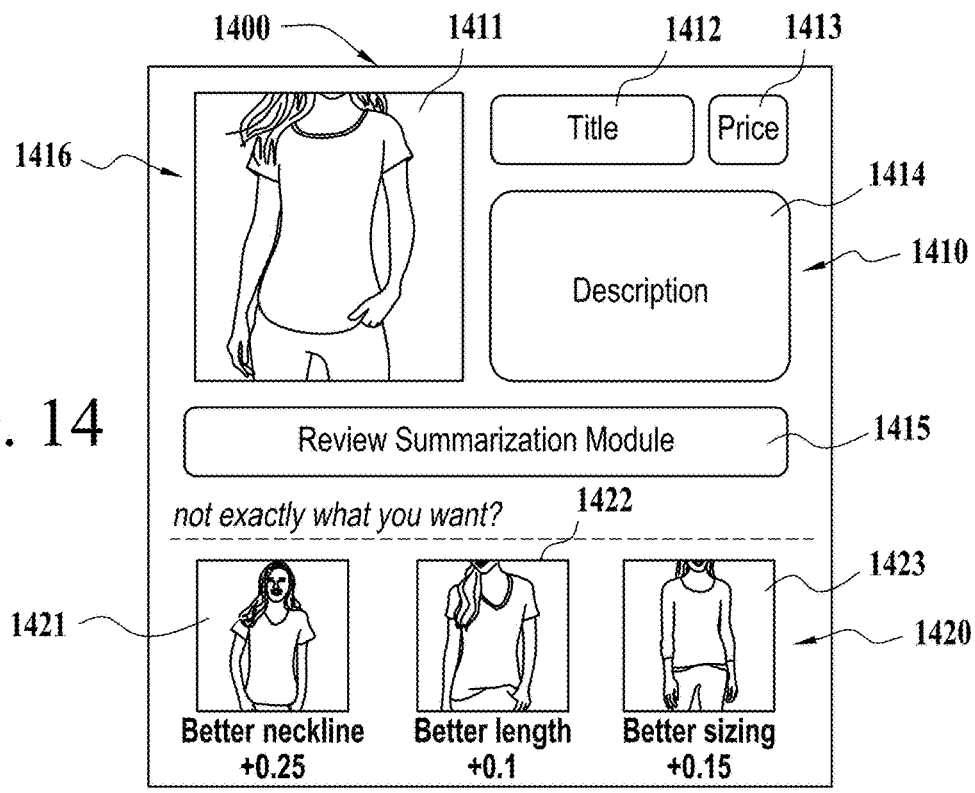
FIG. 14 illustrates a portion of an exemplary webpage showing item page modules and a recommendation module, according to another embodiment.

In some embodiments, the one or more other items can be recommended to the first user in a webpage and/or app that includes details for the selected item and a listing of each of the one or more other items. Turning ahead in the drawings, FIG. 14 illustrates a portion of an exemplary webpage 1400 showing item page modules 1410 and a recommendation module 1420. Webpage 1400 is merely exemplary, and embodiments for providing recommendations based on user-generated post-purchase content and navigation patterns can be employed in many different embodiments or examples not specifically depicted or described herein. In some embodiments, web server 320 (FIG. 3) can provide a webpage, such as webpage 1400, and/or an app to one or more of user computers (e.g., 340-341 (FIG. 3)), which can allow a user (e.g., 350-351 (FIG. 3)), such as the first user, to view the one or more other items that are recommended.

In some embodiments, webpage 1400 can include item page modules 1410 that show details about an item 1416, such as the selected item. For example, item page modules 1410 can include an item image 1411, an item title 1412, an item price 1413, and/or an item description 1414, as are conventional in item pages. In several embodiments, as described above, item page modules 1410 can include a sentiment summarization module 1415, which can be similar or identical to sentiment summarization module 640 (FIG. 6).

In many embodiments, web page 1400 can include recommendation module 1420, which can include a listing of the one or more items to be recommended to the first user, which can include items 1421-1423. For example, if the three lowest sentiment scores for the selected item (e.g., item 1416) displayed in item page modules 1410 are 0.2 for the neckline feature, 0.2 for the length feature, and 0.3 for the sizing feature, system 300 (FIG. 3) can determine that items 1421-1423 are all similar items to the selected item (e.g., item 1416), and that items 1421-1423 each improve upon the features with the lowest sentiment scores. In some embodiments, each of the one or more items recommended (e.g., items 1421-1423) can improve the sentiment score for a different feature. As shown in FIG. 14, item 1421 can improve the sentiment score for the neckline feature by +0.25, which can mean that the sentiment score for the neckline feature for item 1421 is 0.25 higher than the sentiment score for the neckline feature for the selected item (e.g., item 1416) displayed by item page modules 1410. Moreover, item 1422 can improve the sentiment score for the length feature by +0.1, which can mean that the sentiment score for the length feature for item 1422 is 0.1 higher than the sentiment score for the length feature for the selected item (e.g., item 1416) displayed by item page modules 1410. Furthermore, item 1423 can improve the sentiment score for the sizing feature by +0.15, which can mean that the sentiment score for the sizing feature for item 1423 is 0.15 higher than the sentiment score for the sizing feature for the selected item (e.g., item 1416) displayed by item page modules 1410. In many embodiments, information about why the item is recommended (e.g., better neckline +0.25, or more simply, better neckline) can be displayed in recommendation module 1420.

In some embodiments, each of the items (e.g., 1421-1423) in recommendation module 1420 can address a different feature, such as neckline, length, and sizing, in which the sentiment scores are improved from the sentiment scores in selected item 1416. In some embodiments, each item can address only a single feature, such as shown in recommendation module 1421. In other embodiments, one or more of the items can address more than one feature. In the same or other embodiments, more than one item can address a single feature.

Returning to FIG. 4, in several embodiments, method 400 further can include a block 420 of receiving a new request from the first user to view details for a new selected item that is selected from among the one or more other items. For example, when presented with recommendation module 1420 (FIG. 14), the first user can request to view detail for one of the one or more items listed (e.g., items 1421-1423)). This request can be a selection, such as a click to view an item page of the item of the new selected item.

In a number of embodiments, method 400 additionally can include a block 425 of updating the weight that corresponds to each of the one or more first features for the new selected item in the weighting vector for the first user. For example, as illustrated in FIG. 14, item 1423 is selected, which has a better sizing, such that the sizing feature is in the one or more first features, and based on this feature, item 1423 was recommended to the first user, then system 300 (FIG. 3) can determine that the sizing feature is of importance to the first user, and thus can update the weight of the sizing feature for the first user in the weighting vector, $\vec{w}$, for the first user. For example, before the update the initialized weighting vector, $\vec{w}$, can be $$\vec{w} = [0 \ldots 0]$$

in which the first 0 is the weight for the neckline feature, the second 0 is the weight for the length feature, and the last 0 is the weight for the sizing feature for the first user in the category of items (e.g., women's t-shirts). After updating the weights, the weighting vector, $\vec{w}$, can be $$\vec{w} = [0 \ 0 \ldots 1]$$

such that the 1 is the weight for the sizing feature for the first user in the category of items (e.g., women's t-shirts).

Returning to FIG. 4, in many embodiments, blocks 415, 420, and 425 can be iteratively performed such that, for each subsequent iteration, the new request received in block 420 becomes the request in block 415, and the new selected item received in block 420 becomes the selected item in block 415. For example, blocks 415, 420, and 425 can be repeated multiple times as the first user proceeds in a navigation pattern of selecting subsequent recommended items at each iteration.

Figure 15:
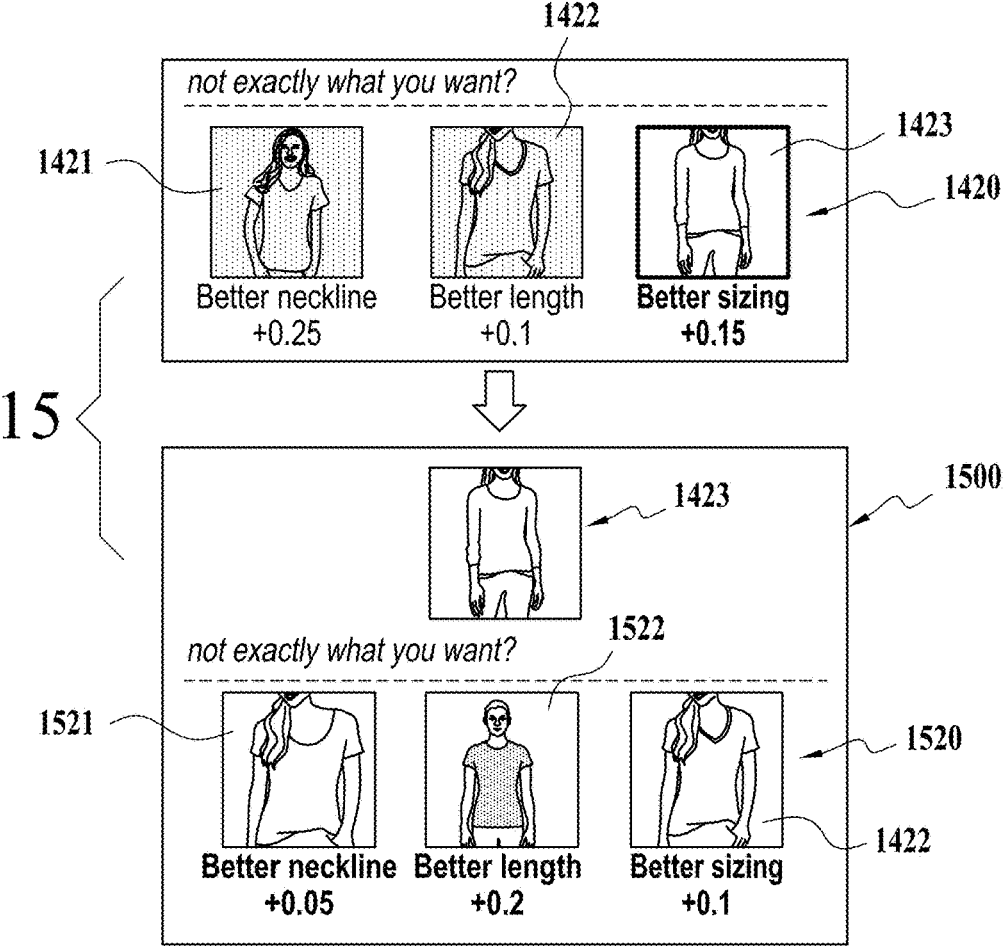
FIG. 15 illustrates a selection of an item in the recommendation module of FIG. 14, and a portion of a web page, according to another embodiment.

Turning ahead in the drawings, FIG. 15 illustrates a selection of item 1423 in recommendation module 1420, and a portion of a web page 1500. Webpage 1500 is merely exemplary, and embodiments for providing recommendations based on user-generated post-purchase content and navigation patterns can be employed in many different embodiments or examples not specifically depicted or described herein. Webpage 1500 can be similar to webpage 1400 (FIG. 14), and various elements of webpage 1500 can be similar or identical to various elements of webpage 1400 (FIG. 14). In some embodiments, web server 320 (FIG. 3) can provide a webpage, such as webpage 1500, and/or an app, to one or more of user computers (e.g., 340-341 (FIG. 3)), which can allow a user (e.g., 350-351 (FIG. 3)), such as the first user, to view the one or more other items that are recommended.

As shown in FIG. 15, the first user can select item 1423 from among items 1421-2423 in recommendation module 1420. In response to selecting the new selected item (e.g., item 1421), system 300 (FIG. 3) can display webpage 1500, which can show details (e.g., an item page) for item 1423 (for simplicity, only the image is shown in FIG. 15), and can which can include a recommendation module 1520. Recommendation module 1520 can include one or more other items that are different from the new selected item (e.g., item 1421), such as an item 1521, an item 1522, and item 1422. In many embodiments, each of these items (e.g., 1521, 1522, 1422) in recommendation module 1520 can be items having features with better sentiment scores than the corresponding features for item 1421, and, in several embodiments, the sentiment scores for these features for item 1421 can be below the first predetermined threshold. When presented with the items (e.g., 1521, 1522, 1422) in recommendation module 1520, the first user can then make a selection of one of these items (e.g., 1521, 1522, 1422), if desired.

Figure 16:
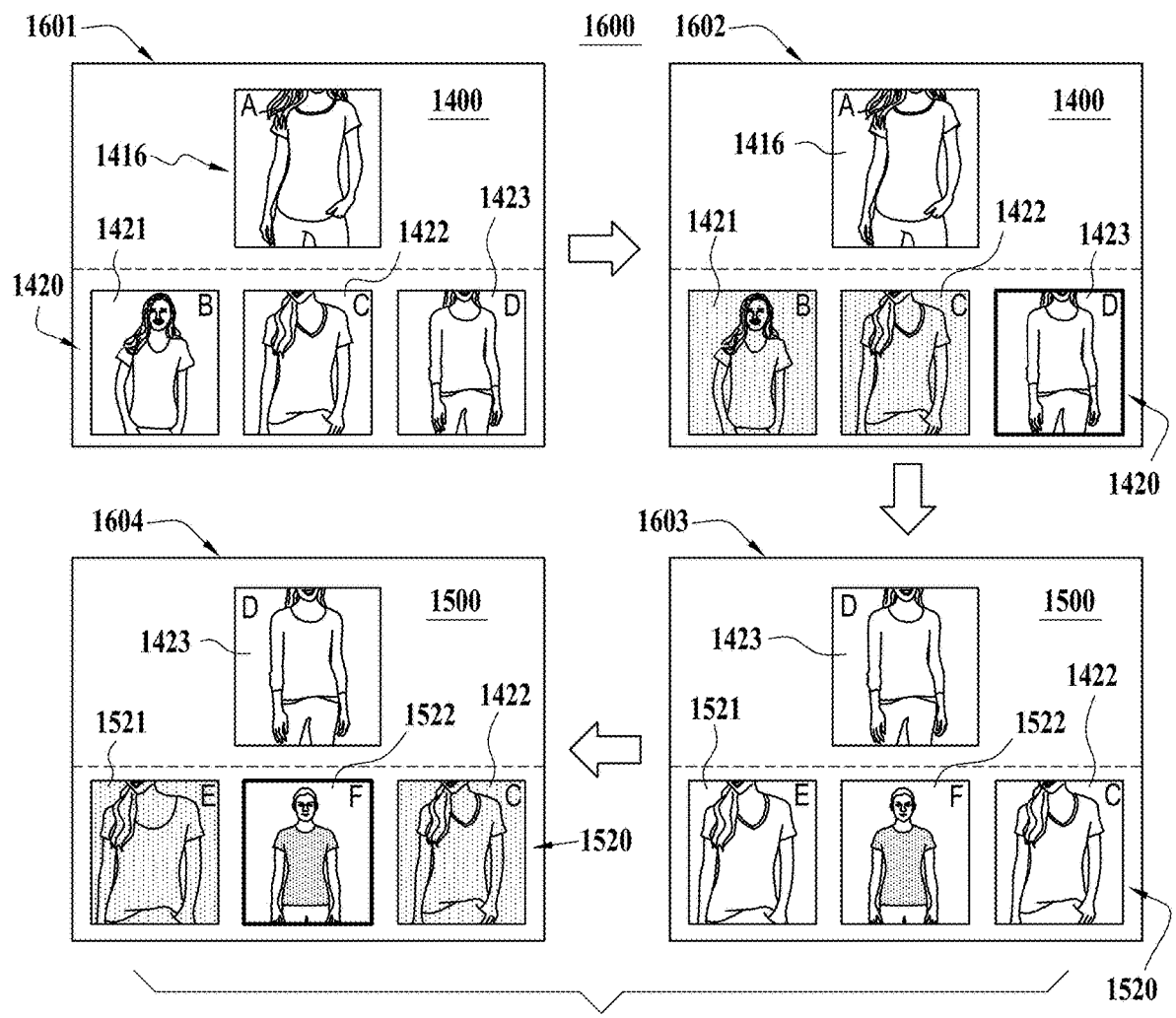
FIG. 16 illustrates an exemplary sequence of recommendation and selections in a navigation pattern.

Turning ahead in the drawings, FIG. 16 illustrates a sequence 1600 of recommendation and selections in a navigation pattern. As shown in FIG. 16, sequence 1600 can include a display 1601 showing webpage 1400, in which item 1416 is displayed (for simplicity, only the image of item 1416 is shown in display 1601) along with recommendation module 1420. In many embodiments, sequence 1600 also can include a display 1602, in which webpage 1400 is again displayed, but showing a selection by the first user of one of the items in recommendation module 1420, such as item 1423, as shown in display 1602.

In several embodiments, sequence 1600 additionally can include a display 1602 showing webpage 1500, in which item 1423 is displayed (for simplicity, only the image of item 1423 is shown in display 1601) along with recommendation module 1520. In a number of embodiments, sequence 1600 also can include a display 1603, in webpage 1500 is again displayed, but showing a selection by the first user of one of the items in recommendation module 1520, such as item 1522, as shown in display 1604.

After each selection, the weighting vector for the first user can be updated. As described above, after the selection of item 1423, as shown in display 1602, which has a higher sentiment score for the sizing feature, the weighting vector, $\vec{w}$, for the first user can be updated to be $$\vec{w}=[0\ 0\ \ldots\ 1],$$

where the 1 in the last element of the weighting vector is the weight for the sizing feature for the first user in the category of items (e.g., women's t-shirts). In several embodiments, after selecting item 1522, as shown in display 1604, which has a higher sentiment score for the length feature, the weighting vector, $\vec{w}$, for the first user can be updated to be $$\vec{w}=[0\ 1\ \ldots\ 1],$$

where the 1 in the second element of the weighting vector is the weight for the length feature for the first user in the category of items (e.g., women's t-shirts).

The sequence of selections, such as shown in displays 1602 and 1604, is a navigation pattern. The user can continue to select other recommended items in the category of items (e.g., women's t-shirts). In many embodiments, each selection in the navigation patter can result in an update to the weighting vector. In many embodiments, the items recommended, such as in the recommendation module (e.g., 1420, 1520) can be take into account an order in which the selections were made in the selection pattern. For example, in display 1603, the items recommended in recommendation module 1520 can take into account that item 1422 was recommended previously (in recommendation module 1420), so when it is recommended in recommendation module 1520, it can be recommended in a different position in the listing of items. In another example, item recommended to address the feature of sizing can be listed in a different position in subsequent recommendations in order to limit positional bias.

In many embodiments, system 300 (FIG. 3) thus can beneficially learn from real-time customer behavior what the customer preferences are, using the tracked weights. In some embodiments, these weights can be the number of clicks that the user (e.g., 350-351 (FIG. 3)) commits towards a specific feature, such that the weights are discrete. In other embodiments, a decay component can be taken into consideration when updating the weights in the weighting vector, which in many embodiments can result in the weights being non-discrete, or continuous. Specifically, for example, system 300 (FIG. 3) can use a decay factor based on an amount of time taken by the first user to select the new selected item.

Figure 17:
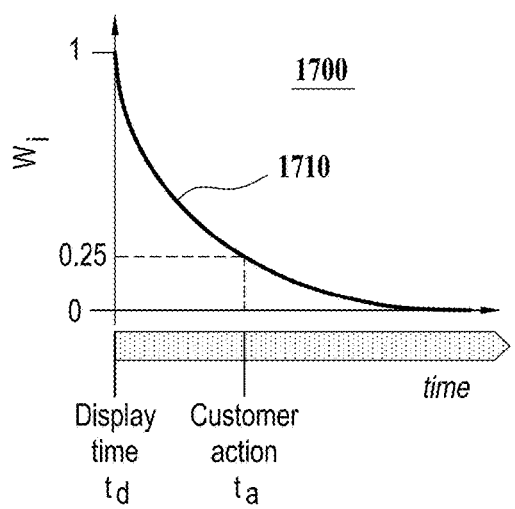
FIG. 17 illustrates a graph showing a decay curve.

Proceeding to the next drawing, FIG. 17 illustrates a graph 1700 showing a decay curve 1710. In many embodiments, a weight, $w_i$, for a feature, i, can be determined based on a time delay between a display time, $t_d$, and a time of customer action, $t_a$. In several embodiments, the weight can be calculated as follows:

$$w_i = \delta(\lambda, t_d - t_a) = e^{(-\lambda(t_d - t_a))},$$

where $\lambda$ is a decay rate that can be predetermined and/or tuned, such as on an empirical or theoretical basis, and where $\delta$ is a decay function. In many embodiments, the decay rate can encompass positional bias. In several embodiments, using the decay curve can advantageously allow system 300 (FIG. 3) to capture user preferences that take into account time delay. For example, a click on an item with a feature that takes place after waiting 4 minutes can be worth a lower weight for that feature than a click on an item after waiting 30 seconds, as the longer wait can indicate less clear intent that the user prefers the new selected item. The weights computed using decay curve can be added to the weighting vector for the relevant features. For example, a weighting vector, $\vec{w}$, can be:

$$\vec{w}=[0\ 0\ 0.45\ 0.25\ 0.5\ 0\ 0\ 0],$$

in which the features are ordered as color, material, design, sizing, fit, price, length, and neckline.

Returning to FIG. 4, in several embodiments, method 400 optionally can include a block 430 of generating, for each item in the category of items, an item boosting signal for the first user based on a dot product of the weighting vector and a score vector representing the sentiment scores for the plurality of features for the item. In several embodiments, items can have pre-existing ranking scores that generally indicate the item popularity (e.g., based on user engagement scores), item relevance (e.g., based on similarity to search query), item importance (e.g., featured items that are boosted in to promote sales of those items), and/or other suitable factors, and which can be used in determining the ordering of items in search and/or browse results, and/or determining which items to recommend. These ranking scores generally are not personalized for each user. An item boosting score can be used to provide a personalized signal that can be used to affect which items are displayed in search/browse results and/or item recommendations. For example, the item boosting signal can be added (or integrated in another way) to the ranking score for an item to personalize the ranking score for the user. Using the item boosting signals to personalize rankings of items, can advantageously help address the "cold start" problem, in which items are new to the market or have little or no engagement data available yet. Using the item boosting signals to personalize rankings of items also can beneficially help personalize results to address the fact that items are often appealing either: (a) to all or most customers, (b) to a limited number or class of customers, or (c) to only a specific customer.

In many embodiments, the item boosting signal can be calculated for an item based on the weighting vector, $\vec{w}$, and the sentiment scores. In some embodiments, the boosting signal can be calculated using a dot product of the weighting vector and a score vector that represents the sentiment scores in a vector. For example, a weighting vector, $\vec{w}$, for the first user, and score vector, $\vec{s}$, for an item can be:

$$\vec{w}=[0\ 0\ 2\ 1\ 1\ 0\ 0\ 0]$$

$$\vec{s}=[0.95\ 0.55\ 0.8\ 0.3\ 0.8\ 1.0\ 0.2\ 0.2],$$

in which the features in each vector are ordered as color, material, design, sizing, fit, price, length, and neckline. The item boosting signal, $\varepsilon_c$, can be calculated using a dot product, as follows:

$$\varepsilon_c = \vec{w} \cdot \vec{s}$$

For the example above, $$\varepsilon_c = \vec{w} \cdot \vec{s} = 0*0.95 + 0*0.55 + 2*0.8 + \ldots + 0*0.2 = 3.9.$$

This item boosting signal of 3.9 can be added to the ranking for the item, or otherwise used to personalize the item for the user. The approach of applying a dot product can yield higher scores when the user has a preference for a particular feature, as tracked in the weight for that feature in the weighting vector, and the sentiment score for that feature, as tracked in the score vector, is higher, thus advantageously making the item boosting signal responsive to both customer intent/preferences and sentiments expressed in user-generated post-purchase content. In other embodiments, other suitable methods of determining the item boosting signal from the weighting vector and the score vector can be used.

In many embodiments, for a particular user, such as the first user, the item boosting signal can be calculated for each item, as each item has a different score vector. The weighting vector can represent real-time customer intent/preferences, while the score vector can be predetermined (e.g., calculated previously offline) using sentiment scores from user-generated post-purchase content.

In several embodiments, item boosting scores also can be calculated when the weighting vector uses continuous, instead of discrete, weights, such as due to using decay curve 1710 (FIG. 17). For example, a weighting vector, $\vec{w}$, for the first user, and score vector, $\vec{s}$, for an item can be:

$$\vec{w}=[0\ 0\ 0.45\ 0.25\ 0.5\ 0\ 0\ 0]$$

$$\vec{s}=[0.95\ 0.55\ 0.8\ 0.3\ 0.8\ 1.0\ 0.2\ 0.2],$$

in which the features in each vector are ordered as color, material, design, sizing, fit, price, length, and neckline. The item boosting signal, $\varepsilon_c$, can be calculated as follows:

$$\varepsilon_c = \vec{w} \cdot \vec{s} = 0*0.95 + 0*0.55 + 0.45*0.8 + \ldots + 0*0.2 = 0.835.$$

This item boosting signal of 0.835 can be added to the ranking for the item, or otherwise used to personalize the item for the user.

In a number of embodiments, method 400 further optionally can include a block 435 of generating updated ranking scores for each item in the category of items for the first user based on the item boosting signal for the item. As described above, the item boosting signal for an item can be used to update ranking scores. In many embodiments, this update to the ranking scores can personalize the rankings based on the user's preferences related to particular features. In some embodiments, the updated ranking scores can be based on adding the item boosting signal for an item to the pre-existing ranking score for an item. In other embodiments, the updated ranking scores can be calculated using the item boosting scores in another suitable manner, such as multiplication, for example.

In several embodiments, method 400 still further optionally can include a block 440 of displaying a list of item results to the first user. In many embodiments, the list of item results can be based on the updated ranking scores for the items in the category of items. As an example, after the ranking scores have been updated using item boosting scores based on the user preferences for the first user, as tracked in the weighting vector, if the first user uses system 300 (FIG. 3) to search for items through a search query or a category browse request, the items that are returned in the search/browse results can be ordered/sorted based on the updated ranking scores. This re-ordering of the results can provide personalized results to each user for a search/browse request. In the same or other embodiments, the item boosting signals and/or updated ranking scores can be used in determining which items to recommend to a user, such as in a recommendation module (e.g., 1420 (FIG. 14), 1520 (FIG. 15)). In many embodiments, the item boosting signals can be used in real-time after one or more selections from a user (e.g., 350-351 (FIG. 3)) to provide personalized item results and/or recommendations.

Figure 18:
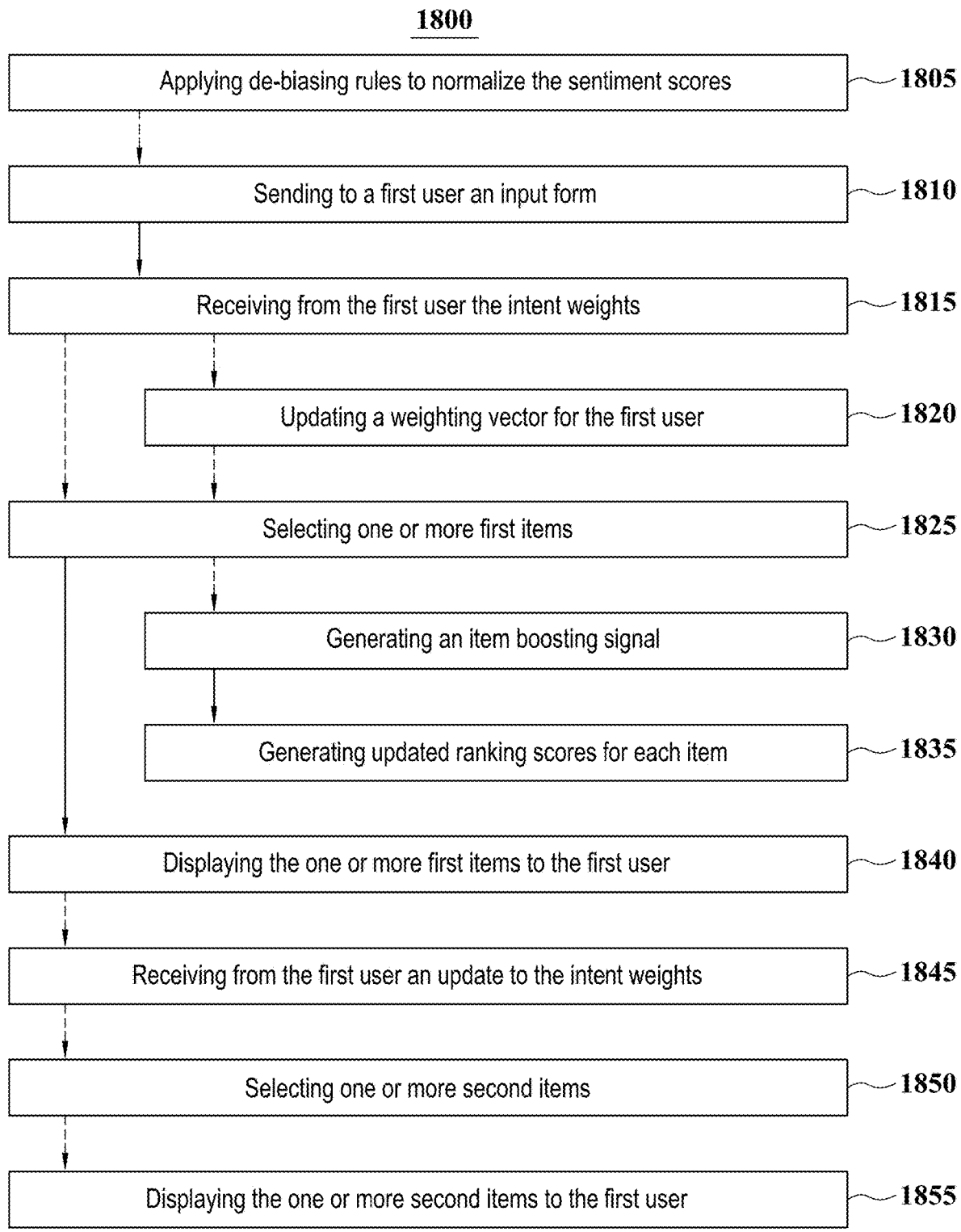
FIG. 18 illustrates a flow chart for a method, according to another embodiment.

Turning ahead in the drawings, FIG. 18 illustrates a flow chart for a method 1800. In some embodiments, method 1800 can be a method of providing recommendations based on user intent and user-generated post-purchase content. Method 1800 is merely exemplary and is not limited to the embodiments presented herein. Method 1800 can be employed in many different embodiments or examples not specifically depicted or described herein. In some embodiments, the procedures, the processes, and/or the activities of method 1800 can be performed in the order presented. In other embodiments, the procedures, the processes, and/or the activities of method 1800 can be performed in any suitable order. In still other embodiments, one or more of the procedures, the processes, and/or the activities of method 1800 can be combined or skipped. In many embodiments, system 300 (FIG. 3) can be suitable to perform method 1800 and/or one or more of the activities of method 1800. In these or other embodiments, one or more of the activities of method 1800 can be implemented as one or more computing instructions configured to run at one or more processors and configured to be stored at one or more non-transitory computer readable media. Such non-transitory computer readable media can be part of a computer system such as sentiment analysis system 310 (FIG. 3) and/or web server 320 (FIG. 3). The processor(s) can be similar or identical to the processor(s) described above with respect to computer system 100 (FIG. 1).

Referring to FIG. 18, method 1800 optionally can include a block 1805 of, before selecting the one or more first items, applying de-biasing rules to normalize the sentiment scores for the features for the plurality of items. In many embodiments, block 1805 can be performed before blocks 1810, 1815, 1820, and/or 1825, which are described below. In several embodiments, block 1805 can be similar or identical to block 405 (FIG. 4).

In several embodiments, method 1800 also can include a block 1810 of sending to a first user an input form comprising an input element for an intent weight for each of a plurality of features. In many embodiments, the plurality of features can represent purchasing criteria that are common to each item in a category of items. The input form can be similar or identical to user intent input form 1900 (FIG. 19), described below.

Figure 19:
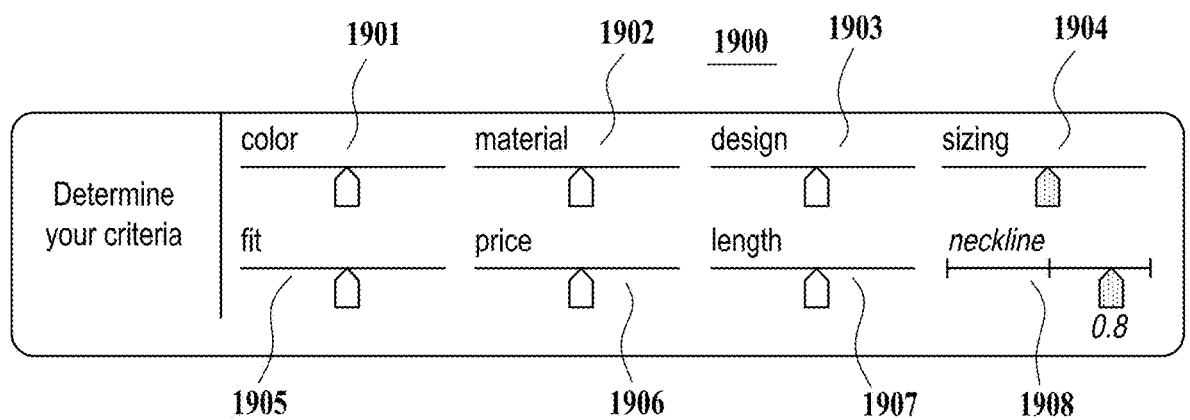
FIG. 19 illustrates an exemplary user intent input form, according to another embodiment.

Turning back in the drawings, FIG. 19 illustrates an exemplary user intent input form 1900. User intent input form 1900 is merely exemplary, and embodiments for providing recommendations based on user intent and user-generated post-purchase content can be employed in many different embodiments or examples not specifically depicted or described herein. In some embodiments, web server 320 (FIG. 3) can provide user intent input form 1900 in a webpage and/or app to one or more of user computers (e.g., 340-341 (FIG. 3)), which can allow a user (e.g., 350-351 (FIG. 3)), such as the first user, to input intent weights for the plurality of features.

As shown in FIG. 19, user intent input form 1900 can include input elements, such as input elements 1901-1908. In many embodiments, each input element can allow the first user to input an intent weight for a particular feature. In some embodiments, each of the input elements (e.g., 1901-1908) in the input form (e.g., user intent input form 1900) can include a slider, which can be display the current value of the intent weight and/or can adjusted by the first user to indicate an intent weight. In the same or other embodiments, the input elements can receive intent weights through numerical input or another suitable form of input. As shown in FIG. 19, the intent weight in each input element (e.g., 1901-1908) can be initialized to a neutral value (e.g., 0.5 on a scale of 0 to 1, or 0 on a scale of −1 to 1). The first user can then adjust one or more of the sliders, such as input element 1908 for the neckline feature to another value, such as 0.8 on a scale of 0 to 1 to indicate that neckline is an important purchase criteria to the first user.

In some embodiments, user intent input form 1900 can be sent to the first user by displaying user intent input form on a webpage and/or app. For example, when the first user searches or browses for women's t-shirts, the first user can be presented with user intent input form 1900 before, in conjunction with, or after receiving the results of the search/browse request. In other embodiments, user intent input form 1900 can be sent to the first user through email or another suitable communication method.

Returning to FIG. 18, in a number of embodiments, method 1800 additionally can include a block 1815 of receiving from the first user the intent weights for the plurality of features. In many embodiments, each of the intent weights can represent a level of importance of a different feature of the plurality of features to the first user. For example, the intent weights can be received through the sliders of one or more of the input elements (e.g., 1901-1908 (FIG. 19)) being adjusted on user intent input form 1900 (FIG. 19), or through another suitable method.

In several embodiments, method 1800 optionally can include a block 1820 of updating a weighting vector for the first user based on the intent weights for the plurality of features received from the first user. In many embodiments, the weighting vector can be similar or identical to the weighting vector, $\vec{w}$, described above. In a number of embodiments, the weighting vector can track the intent weights corresponding to each feature of a plurality of features for the first user. In various embodiments, the intent weights received in block 1815 can be somewhat different from the weights updated in block 425 (FIG. 4). Specifically, the weights updated in block 425 (FIG. 4) can be inferred from user navigation patterns of the first user. The intent weights received in block 1815, by contrast, are explicitly provided by the first user. In each case, however, the weights or intent weights in the weighting vector can represent a personalized intent or preference for a particular user with respect to the features.

In a number of embodiments, method 1800 further can include a block 1825 of selecting one or more first items from among a plurality of items in the category of items based at least in part on: (a) the intent weights for the plurality of features for the first user, and (b) sentiment data comprising a sentiment score for each feature for each of the plurality of items. In many embodiments, the sentiment scores for the plurality of features for each of the plurality of items can be derived from user-generated post-purchase content about the plurality of items. In some embodiments, block 1825 can be similar to block 415 (FIG. 4).

In several embodiments, block 1825 can include a block 1830 of generating, for each item of the plurality of items, an item boosting signal for the first user based on a dot product of the weighting vector and a score vector representing the sentiment scores for the plurality of features for the item. In many embodiments, block 1830 can be similar or identical to block 430 (FIG. 4).

In a number of embodiments, block 1825 also can include a block 1835 of generating updated ranking scores for each item in the plurality of items based on the item boosting signal for the item for the first user. In many embodiments, block 1835 can be similar or identical to block 435 (FIG. 4). In many embodiments, the one or more first items can be selected in block 1825 based on the updated ranking scores for each item in the plurality of items. In other embodiments, the one or more first items can be selected using another suitable method. As a non-limiting example, the one or more first items can be selected only when each of the sentiment scores for each of the features for each of the one or more first items exceeds the input weight (or, in some embodiments, an adjust input weight that has the same range of values as the sentiment scores) for each of the corresponding features.

In several embodiments, method 1800 additionally can include a block 1840 of displaying the one or more first items to the first user in real-time after receiving the intent weights. For example, in many embodiments, the one or more first items can be displayed in a webpage, such as webpage 2000 (FIG. 20), described below, and/or an app.

Figure 20:
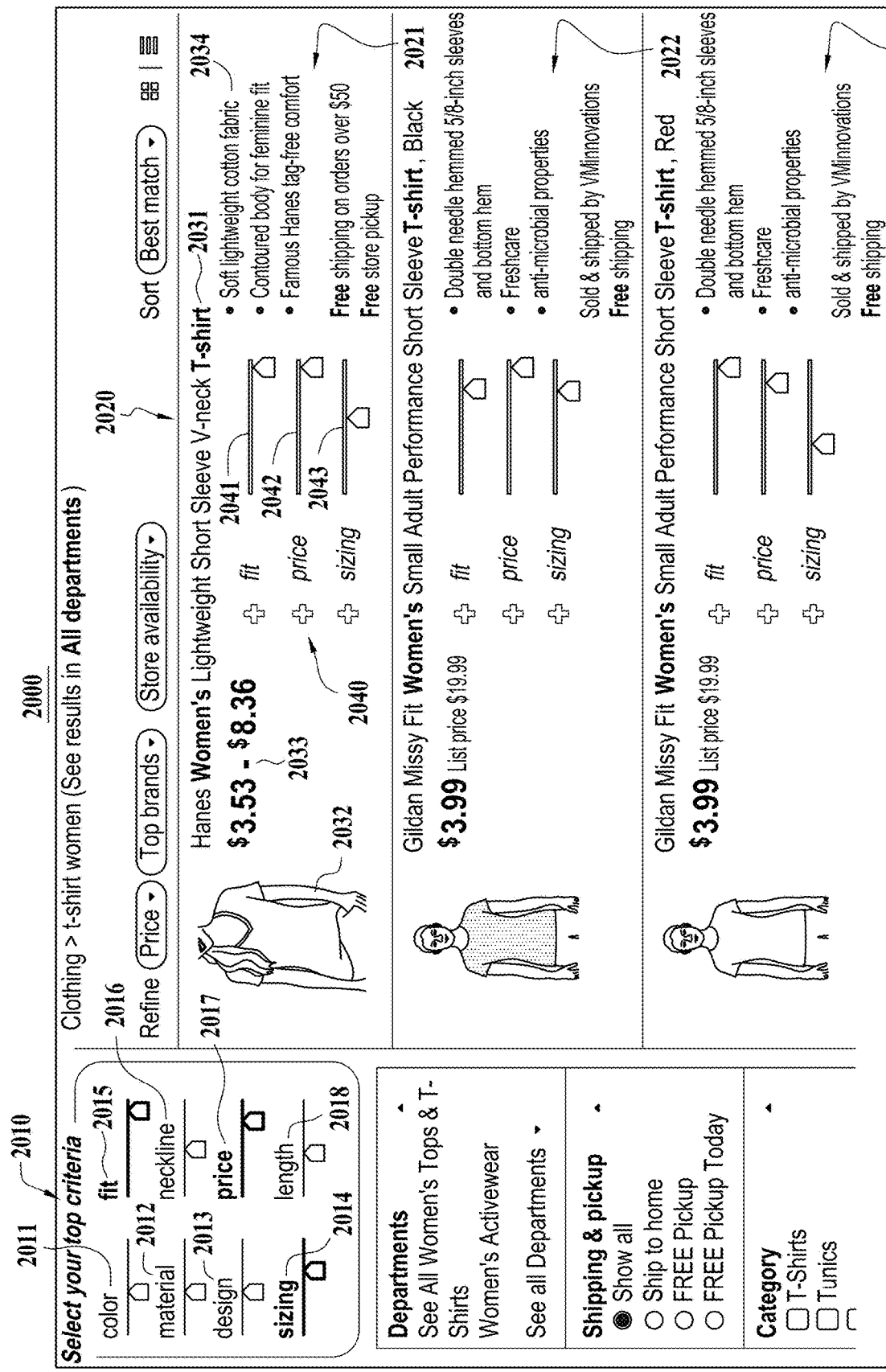
FIG. 20 illustrates a portion of a webpage showing an item results listing for browse results in a "t-shirt women" browse category based on a user intent input form, according to another embodiment.

Turning ahead in the drawings, FIG. 20 illustrates a portion of a webpage 2000 showing an item results listing 2020 for browse results in a "t-shirt women" browse category based on a user intent input form 2010. Webpage 2000 is merely exemplary, and embodiments for providing recommendations based on user intent and user-generated post-purchase content can be employed in many different embodiments or examples not specifically depicted or described herein. In some embodiments, web server 320 (FIG. 3) can provide a webpage, such as webpage 2000, to one or more of user computers (e.g., 340-341 (FIG. 3)), which can allow a user (e.g., 350-351 (FIG. 3)), such as the first user, to view the one or more first items selected in block 1825 (FIG. 18). Webpage 2000 can be a result page for search or browse results, which can be different from webpages 1400 (FIG. 14) and 1500 (FIG. 15), which are item pages showing details for a particular item.

User intent input form 2010 can be similar or identical to user intent input form 1900 (FIG. 19), and various elements of user intent input form 2010 can be similar or identical to various elements of user intent input form 1900 (FIG. 19). In many embodiments, user intent input form 2010 can include input elements 2011-2018, which can be similar to input elements 1901-1908. In several embodiments, user intent input form 2010 can display the selections of intent weights for the features provided by the first user, and/or allow the first user to update the intent weights for the features. In some embodiments, the input elements (e.g., 2011-2018) for certain of the features can be removed and/or grayed out (not shown) if the features are not particularly relevant to the search/browse results in item results listing 2020. In other embodiments, certain features that are deemed more relevant can be highlighted, such as shown for input element 2014 for sizing, input element 2015 for fit, and input element 2017 for price in user intent input form 2010.

In several embodiments, item results listing 2020 can include items, such as items 2021-2023. In a number of embodiments, each item (e.g., 2021-2023) in item results listing 2020 can include some basic item information. For example, the item information for item 2021 can include a title 2031, a display image 2032, a price 2033 (or price range), a description 2034, and/or other suitable information, such as special deals, etc. In many embodiments, each item (e.g., 2021-2023) in item results listing 2020 can include a sentiment summarization module 2040. Sentiment summarization module 2040 can be similar or identical to sentiment summarization module 640 (FIG. 6). In a number of embodiments, sentiment summarization module 2040 can include sentiment scores, such as sentiment scores 2041-2043, for the features, or a subset of the features that are relevant to the category of items, the search/browse results in item results listing 2020, and/or the item. For example, the sentiment scores for fit, price, and sizing can be displayed in sentiment scores 2041, 2042, and 2043, respectively, which can correspond to the highlighted input elements (e.g., 2014, 2015, 2017) in user intent input form 2010. In some embodiments, the sentiment scores can be displayed as a slider display (e.g., dynamic ruler), or in another suitable visual element representing a numeric score.

In many embodiments, the items (e.g., 2021-2023) displayed in item results listing 2020 can be selected as described in blocks 1825, 2830, and/or 1835, such as based on the intent weights displayed in user intent input form 2010 and the sentiment scores for the items, and, in some embodiments, can further be based on rankings that are updated based on the intent weights and sentiment scores. Once the items (e.g., 2021-2023) are displayed in item results listing 2020, the first user can review the items (e.g., 2021-2023), including the sentiment scores (e.g., 2041-2043), to determine if any of the items (e.g., 2021-2023), such as the one or more first items, are liked by the first user. If so, the first user can click on the item (e.g., 2021-2023) to view details about the item, and purchase the item, if desired.

Returning to FIG. 18, in several embodiments, method 1800 optionally can include a block 1845 of receiving from the first user an update to the intent weights for the plurality of features. For example, returning to FIG. 20, if the first user does not see any items (e.g., 2021-2023) that the first user likes in item results listing 2020, the user can adjust one or more of the intent weights in user intent input form 2010 to change the items listed in item results listing 2020. In several embodiments, the update can be these one or more adjustments to the intent weights. For example, the first user can adjust the sliders for one or more of input elements 2011-2018. In many embodiments, the weighting vector can be updated based on the update to the intent weights, similarly as performed in block 1820.

In many embodiments, updating intent weights can be different from update filters for attributes/facets and/or price ranges. Filters for attributes/facets generally filter items based on static attribute values (i.e., facet values) about an item. For example, a filter for televisions in conventional filters approach can be on the facet of screen size, which can be in increments of 10", such as 20"-30", 30"-40", 40"-50", 50"-60", 60"-70", etc. Adjusting a slider that filters items based on such a facet would filter items based on the static value of screen size for each item. By contrast, adjusting the intent weight sliders for an input element (e.g., 2011-2018) can result in a selection of results that is based on the one or more intent weights listed in user intent input form 2010, and the one or more sentiment scores for the features that are based on user-generated post-purchase data, such that the items in the item results listing (e.g., 2020) can meet a specified level of positive customer feedback for the features.

As another example of the differences, a filter for price in a conventional filtering approach can adjust the range of prices, such that the items are filtered so that only items below a specified price (e.g., $5) are displayed. By contrast, adjusting the intent weight sliders for an input element (e.g., 2011-2018) such as input element 2017 for price can result in a selection of results that is based on the one or more intent weights listed in user intent input form 2010, and the one or more sentiment scores for the features that are based on user-generated post-purchase data, such that the items in the item results listing (e.g., 2020) can meet a specified level of positive customer feedback for the features, including for the feature of price.

Returning to FIG. 18, in several embodiments, method 1800 further optionally can include a block 1850 of selecting one or more second items from among a plurality of items based at least in part on: (a) the update to the intent weights for the plurality of features for the first user, and (b) the sentiment data. In many embodiments, block 1850 can be similar to blocks 1825, 1830, and/or 1835, but based on the update to the intent weights to select one or more second items. The one or more second items can be at least partially different from the one or more first items.

In several embodiments, method 1800 still further optionally can include a block 1855 of displaying the one or more second items to the first user in real-time after receiving the update to the intent weights. Block 1855 can be similar to block 1840, but using the one or more second items selected in block 1850.

Figure 21:
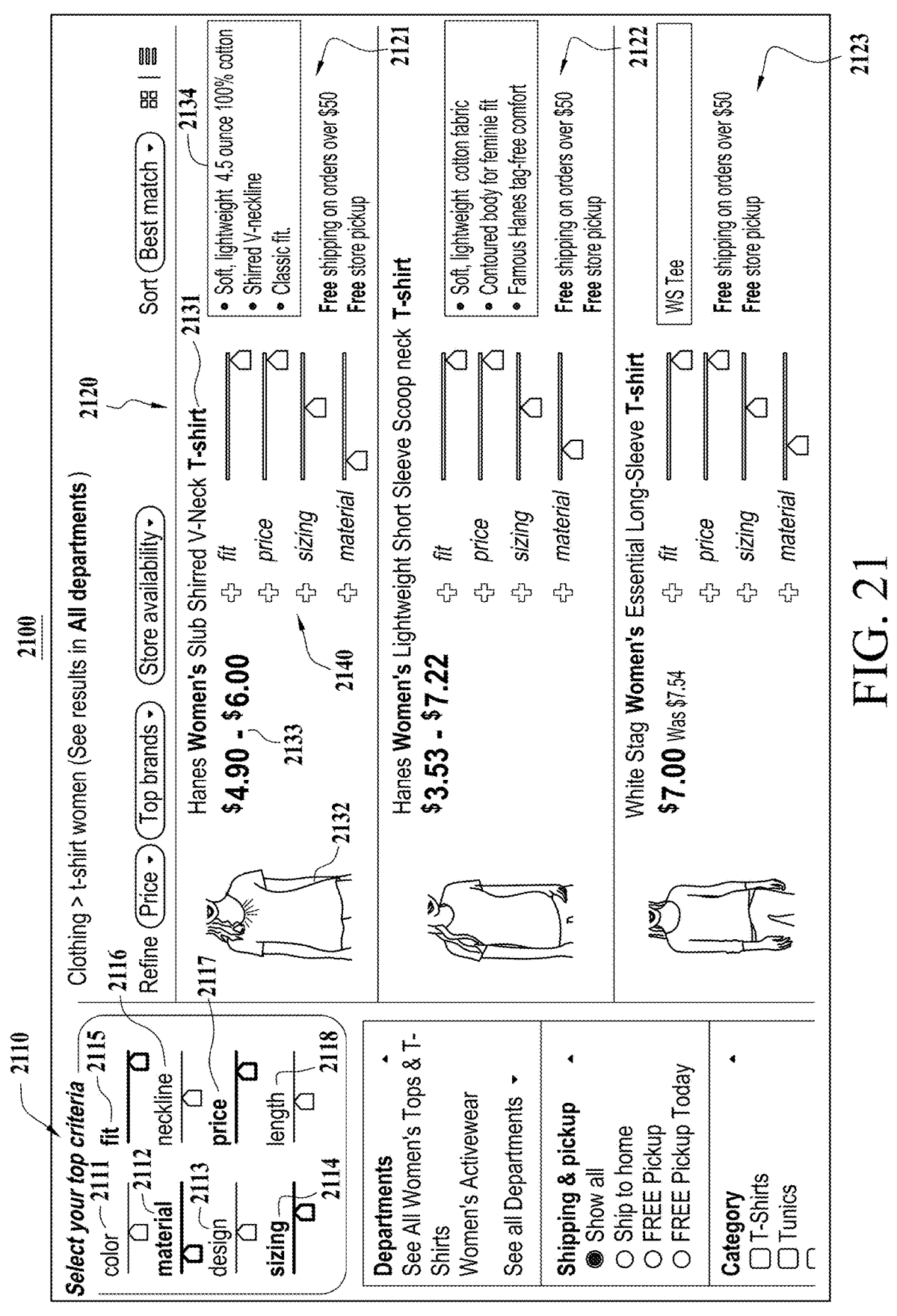

Turning ahead in the drawings, FIG. 21 illustrates a portion of a webpage 2100 showing an item results listing 2120 for browse results in a "t-shirt women" browse category based on an update to intent weights in a user intent input form 2110. Webpage 2100 is merely exemplary, and embodiments for providing recommendations based on user intent and user-generated post-purchase content can be employed in many different embodiments or examples not specifically depicted or described herein. In some embodiments, web server 320 (FIG. 3) can provide a webpage, such as webpage 2100, and/or an app, to one or more of user computers (e.g., 340-341 (FIG. 3)), which can allow a user (e.g., 350-351 (FIG. 3)), such as the first user, to view the one or more second items selected in block 1850 (FIG. 18).

Webpage 2100 can be a result page, can be similar to webpage 2000 (FIG. 20), but can show new results due to an updated item weight. Specifically, user intent input form 2110 can include input elements 2111-2118, which can be identical to input elements 2011-2018, respectively, in user intent input form 2010 (FIG. 20), but the selection of the input weight in input element 2012 in FIG. 20 for the material feature has been updated in input element 2112 to a different input weight. For example, the first user can update the material feature by decreasing the intent weight for the material features, which can mean that the first user comprises on the material feature to allow additional items to be included in which the sentiment scores for the material feature are lower.

Item results listing 2120 can be similar to item results listing 2020 (FIG. 20), and can include items, such as items 2121-2123, which can be similar to items 2021-2023, each of which can include item information, such as, for item 2121, a title 2131, a display image 2132, a price 2133 (or price range), a description 2134, and/or other suitable information, such as special deals, etc. Item results listing 2120, however, can be updated to show the one or more second items selected in block 1850 (FIG. 18).

In many embodiments, each item (e.g., 2021-2023) in item results listing 2120 can include a sentiment summarization module 2140. Sentiment summarization module 2140 can be similar or identical to sentiment summarization module 640 (FIG. 6) and/or sentiment summarization module 2040 (FIG. 20), and various elements of sentiment summarization module 2140 can be similar or identical to various elements of sentiment summarization module 640 (FIG. 6) and/or sentiment summarization module 2040 (FIG. 20). In a number of embodiments, sentiment summarization module 2140 can include sentiment scores for features displayed in sentiment summarization module 2040 (FIG. 20), as well as additional features, such as for features that had intent weights updated in user intent input form 2110, such as material.

Once the items (e.g., 2121-2123) are displayed in item results listing 2120, the first user can review the items (e.g., 2121-2123), including the sentiment scores (e.g., 2141-2143), to determine if any of the items (e.g., 2121-2123), such as the one or more second items, are liked by the first user. If so, the first user can click on the item (e.g., 2121-2123) to view details about the item, and purchase the item, if desired. If not, the first user can further update the intent weights in user intent input form 2110.

Figure 22:
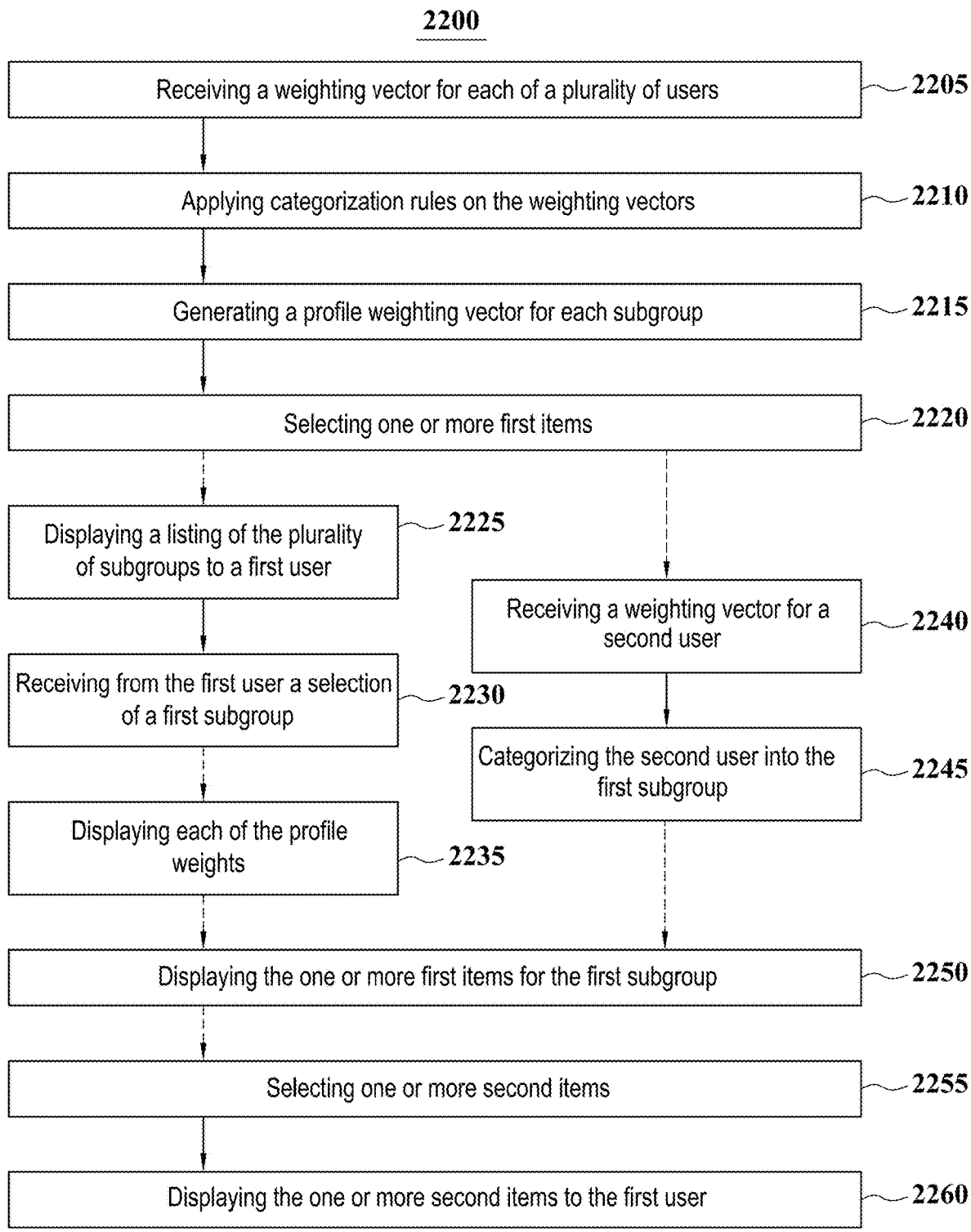
FIG. 22 illustrates a flow chart for a method 2200, according to another embodiment.

Turning ahead in the drawings, FIG. 22 illustrates a flow chart for a method 2200. In some embodiments, method 2200 can be a method of performing customer segmentation and item categorization. Method 2200 is merely exemplary and is not limited to the embodiments presented herein. Method 2200 can be employed in many different embodiments or examples not specifically depicted or described herein. In some embodiments, the procedures, the processes, and/or the activities of method 2200 can be performed in the order presented. In other embodiments, the procedures, the processes, and/or the activities of method 2200 can be performed in any suitable order. In still other embodiments, one or more of the procedures, the processes, and/or the activities of method 2200 can be combined or skipped. In many embodiments, system 300 (FIG. 3) can be suitable to perform method 2200 and/or one or more of the activities of method 2200. In these or other embodiments, one or more of the activities of method 2200 can be implemented as one or more computing instructions configured to run at one or more processors and configured to be stored at one or more non-transitory computer readable media. Such non-transitory computer readable media can be part of a computer system such as sentiment analysis system 310 (FIG. 3) and/or web server 320 (FIG. 3). The processor(s) can be similar or identical to the processor(s) described above with respect to computer system 100 (FIG. 1).

Referring to FIG. 22, method 2200 optionally can include a block 2205 of receiving a weighting vector for each of a plurality of users. In many embodiments, the weighting vector can track a weight corresponding to each feature of a plurality of features. For example, the weighting vector can be similar or identical to the weighting vectors described above. The weight can be similar or identical to the weights and/or intent weights described above. In several embodiments, the plurality of features can represent purchasing criteria that are common to each item in a category of items, as described above. In some embodiments, each of the weights in the weighting vector for each user of the plurality of users can represent a level of importance of a different feature of the plurality of features to the user.

In several embodiments, the weighing vectors can be generated and/or updated as described above, such as in methods 400 (FIG. 4) and/or 1800 (FIG. 18). In some embodiments, the weighting vectors for at least a portion of the users can be based at least in part on intent weights received from the portion of the users. For example, the intent weights can be received through user intent input forms 1900 (FIG. 19), 2010 (FIG. 20), and/or 2110 (FIG. 21). In the same or other embodiments, the weighting vectors for at least a portion of the users can be based at least in part on selections of recommended items received from the portion of the users. For example, the selections can be items selected in a recommendation module, such as recommendation modules 1420 (FIG. 14) and/or 1520 (FIG. 15).

Figure 23:
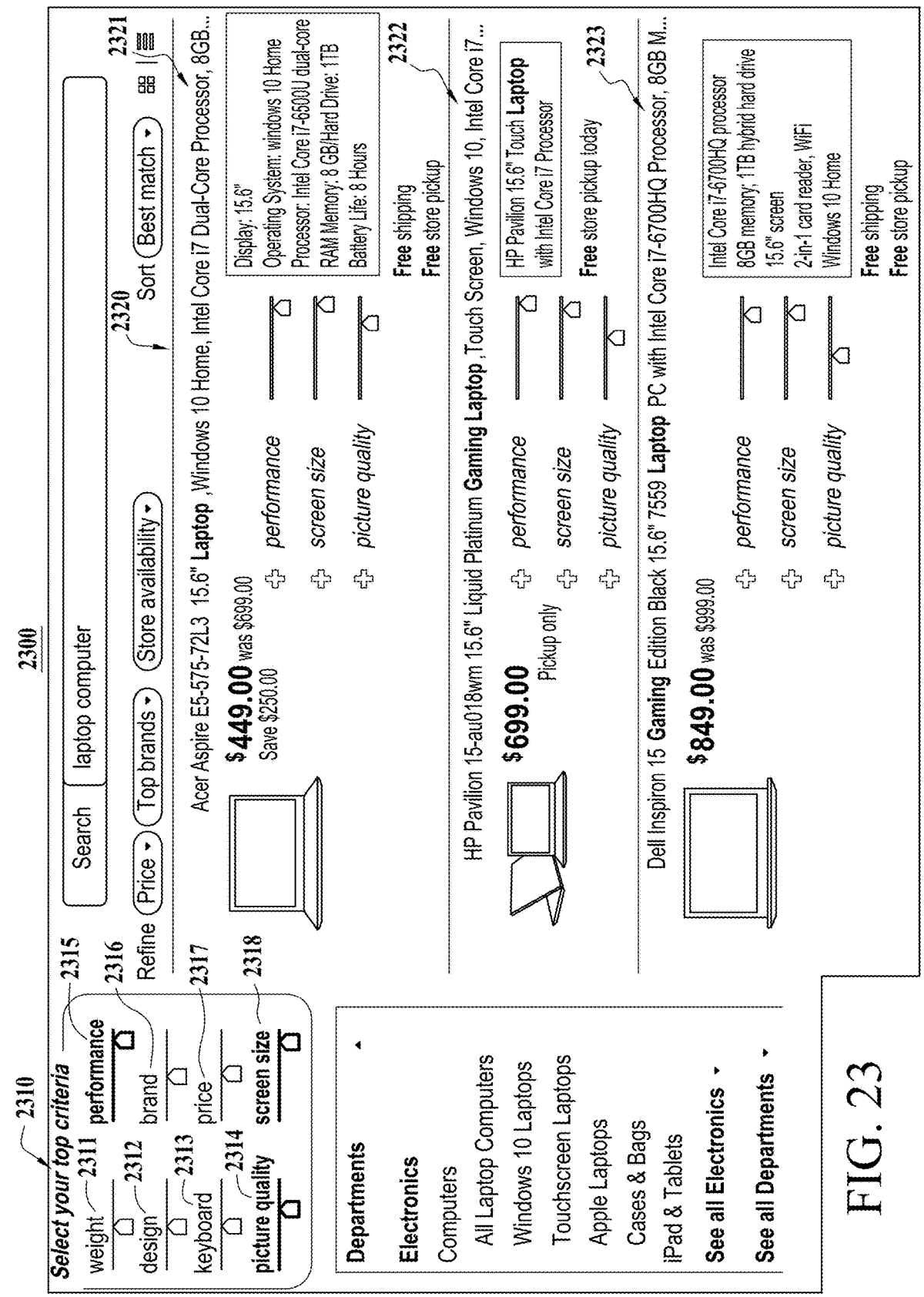
FIG. 23 illustrates a portion of a webpage showing an item results listing for search results for a "laptop computer" search query based on an update to intent weights in a user intent input form, according to another embodiment.

Turning ahead in the drawings, FIG. 23 illustrates a portion of a webpage 2300 showing an item results listing 2320 for search results for a "laptop computer" search query based on an update to intent weights in a user intent input form 2310. Webpage 2300 is merely exemplary, and embodiments for performing customer segmentation and item categorization can be employed in many different embodiments or examples not specifically depicted or described herein. In some embodiments, web server 320 (FIG. 3) can provide a webpage, such as webpage 2300, and/or an app, to one or more of user computers (e.g., 340-341 (FIG. 3)), which can allow a user (e.g., 350-351 (FIG. 3)) to view items selected as a result of the search query and the intent weights in user intent input form 2310.

Webpage 2300 can be a result page, and can be similar to webpage 2000 (FIG. 20) and/or webpage 2100 (FIG. 21), and various elements of webpage 2300 can be similar or identical to various elements of webpage 2000 (FIG. 20) and/or webpage 2100 (FIG. 21). In many embodiments, user intent input form 2310 can include input elements 2311-2318, which can be similar to input elements 2011-2018 (FIG. 20) and/or input elements 2111-2118 (FIG. 21). The features corresponding to input elements 2311-2318 can be features for the category or categories of items in which the search results for "laptop computer" are found. For example, the features can be weight, design, keyboard, picture quality, performance, brand, price, and screen size.

In many embodiments, a user (e.g., 350-351 (FIG. 3)) can update one or more of these input elements (e.g., 2311-2318) to adjust the select desired input weights that reflect the intent/preferences of the user (e.g., 350-351 (FIG. 3)), as shown in FIG. 23. For example, the user (e.g., 350-351 (FIG. 3)) can update input elements corresponding to the picture quality, performance, and screen size features by increasing the input weights for each of those features to indicate that the user has a preference for those features to be good. Item results listing 2320 can be similar to item results listing 2120 (FIG. 20) and/or item results listing 2320, and can include items, such as items 2321-2323, which can be similar to items 2021-2023 (FIG. 20) and/or items 2121-2123 (FIG.

21), but which can be selected based on the search query of "laptop computer" and the item weights of the features, as selected in user intent input form 2310.

The intent weights selected in input elements 2311-2318 indicate that the user (e.g., 350-351 (FIG. 3)) cares highly about performance and screen size, and somewhat about picture quality. This combination of intent weights can indicate that the user (e.g., 350-351 (FIG. 3)) is likely a gamer, or in other words, a user that is interested in using the laptop computer for playing computer games. As users (e.g., 350-351 (FIG. 3)) provide intent weights, system 300 (FIG. 3) can store this data, such as in weighting vectors for each user. In some embodiments, weighting vectors for each category of items can be stored for each user.

Figure 24:
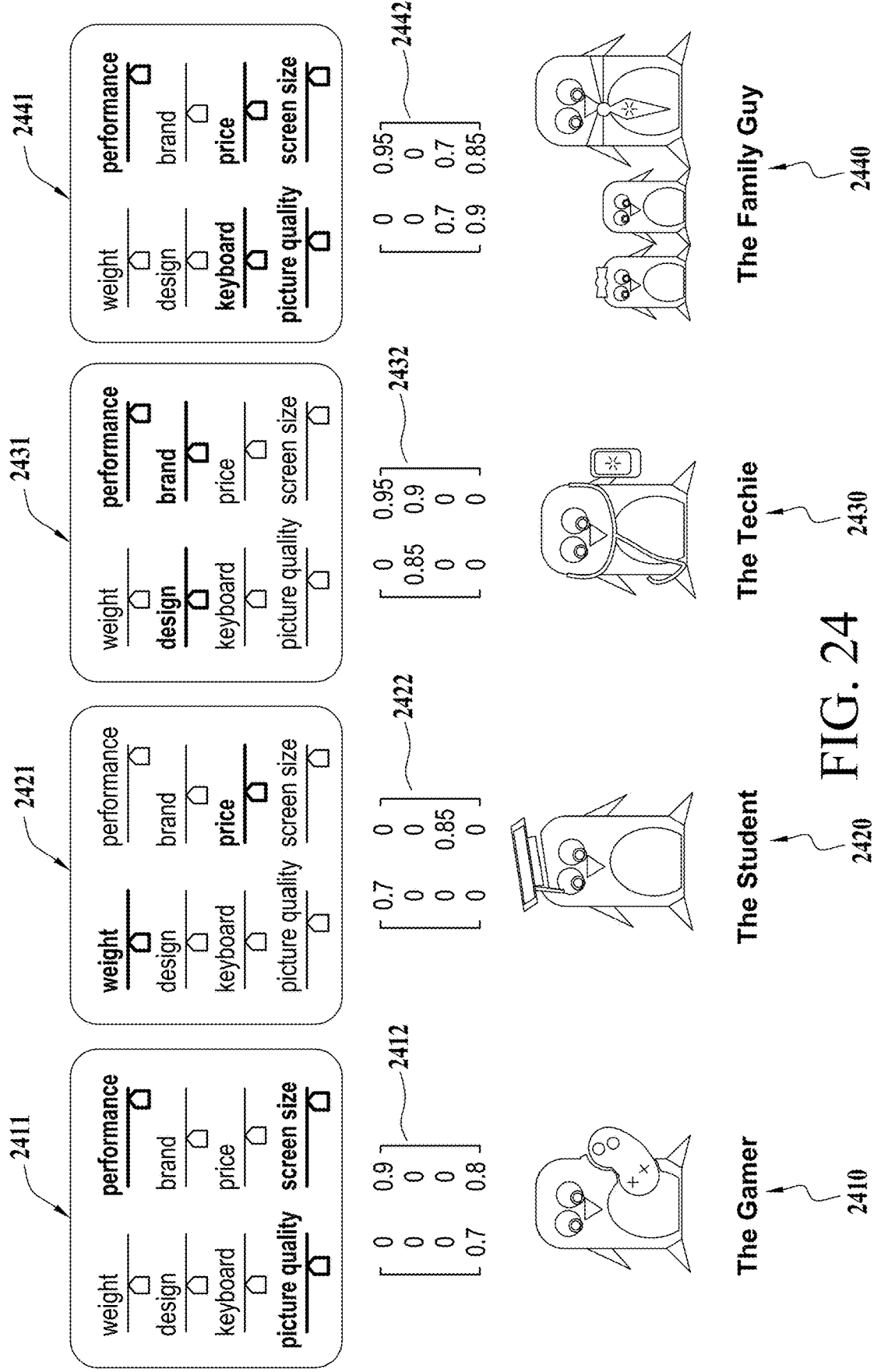
FIG. 24 illustrates various categories of users who search for items in the "laptop computers" category.

Turning ahead in the drawings, FIG. 24 illustrates various categories 2410, 2420, 2430, and 2440 of users who search for items in the "laptop computers" category. FIG. 24 includes user intent input forms 2411, 2421, 2431, and 2441, which can be similar to user intent input forms 1900 (FIG. 19), 2010 (FIG. 20), 2110 (FIG. 21), and/or 2310 (FIG. 23). FIG. 24 also includes weighting vectors 2412, 2422, 2432, and 2442, which are associated with and track the input weights in each of user intent input forms 2411, 2421, 2431, and 2441, respectively.

For example, category 2410 of "the gamer" can have preferences for picture quality, performance, and screen size. For example, a user (e.g., 350-351 (FIG. 3)) in this category can set the input weight for the picture quality feature to 0.7, the input weight for the performance feature to 0.9, and the input weight for the screen size feature to 0.8, as shown in user intent input form 2411 and weighting vector 2412.

As another example, category 2420 of "the student" can have preferences for weight and price. For example, a user (e.g., 350-351 (FIG. 3)) in this category can set the input weight for the weight feature to 0.7, and the input weight for the price feature to 0.85, as shown in user intent input form 2421 and weighting vector 2422.

As an additional example, category 2430 of "the techie" can have preferences for design, performance, and brand. For example, a user (e.g., 350-351 (FIG. 3)) in this category can set the input weight for the design feature to 0.85, the input weight for the performance feature to 0.95, and the input weight for the brand feature to 0.9, as shown in user intent input form 2431 and weighting vector 2432.

As a further example, category 2440 of "the family guy" can have preferences for keyboard, picture quality, performance, price, and screen size. For example, a user (e.g., 350-351 (FIG. 3)) in this category can set the input weight for the keyboard feature to 0.7, the input weight for the picture quality feature to 0.9, the input weight for the performance feature to 0.95, the input weight for the price feature to 0.7, and the input weight for the screen size feature to 0.85, as shown in user intent input form 2441 and weighting vector 2442

Returning to FIG. 22, in several embodiments, method 2200 also can include a block 2210 of applying categorization rules on the weighting vectors for the plurality of users to categorize the plurality of users into a plurality of subgroups. The subgroups can be similar or identical to categories 2410, 2420, 2430, and 2440 shown in FIG. 24, as an example. In many embodiments, the subgroups can be predetermined, such as by a business analyst, before the categorization. In some embodiments, the categorization rules can perform classification using decision trees, random forests, or another suitable supervised or semi-supervised machine learning classification technique. In other embodiments, the categorization rules can perform an unsupervised machine learning clustering technique, such as a co-clustering technique, for example. In several embodiments, a density-based clustering technique can be used. In co-clustering techniques, also known as biclustering, simultaneous clustering can be performed on both users and items at the same time, which can allow for clustering items within the context of a specific subgroup of users, and/or vice-versa. As an example of a co-clustering technique, bipartite spectral graph partitioning can be performed as part of the categorization rules. In some embodiments, k-nearest neighbors can be performed, such as using pre-existing customer market segmentation data as an input influencing the number of clusters. In some embodiments, the categorization of subgroups can change over time based on trends.

In a number of embodiments, method 2200 additionally can include a block 2215 of generating a profile weighting vector for each subgroup of the plurality of subgroups. In many embodiments, the profile weighting vector can be similar to a weighting vector. In several embodiments, the profile weighting vector can include a profile weight corresponding to each feature of the plurality of features that is based on weights for a corresponding one of the feature in the weighting vectors of users from among the plurality of users that are categorized into the subgroup. For example, category 2410 of "the gamer" in FIG. 24 can have a profile weighting vector similar or identical to weighting vector 2412, which can provide a representative profile of the weighting vectors for the users categorized into the subgroup that correspond to category 2410. In some embodiments, the profile weighting vector can be identical to, or based on, labeled training for predefined labeled subgroups types (e.g., categories 2411, 2421, 2431, 2441). For example, if the predefined categories for the subgroups are categories 2410, 2420, 2430, and 2440, as shown in FIG. 24, the profile weighting vectors the same as weighting vector 2412, 2422, 2432, and 2442, respectively. In other embodiments, the profile weighting vector can be derived from the weighting vectors clustered into a subgroup, such as by determining the mean or median of the weighting vectors in the subgroup. In some embodiments, clustered subgroups can be labeled after clustering by human judgment or, alternatively, by machine.

In several embodiments, method 2200 further can include a block 2220 of selecting, for a first subgroup of the plurality of subgroups, one or more first items from among a plurality of items in the category of items based at least in part on: (a) the profile weights of the profile weighting vector for the first subgroup, and (b) sentiment data comprising a sentiment score for each feature for each of the plurality of items. As described above, the sentiment scores for the plurality of features for each of the plurality of items being derived from user-generated post-purchase content about the plurality of items. In many embodiments, block 2220 can be similar to blocks 415 (FIG. 4), 430 (FIG. 4), 435 (FIG. 4), 1825 (FIG. 18), 1830 (FIG. 18), 1835 (FIG. 18), and/or 1850 (FIG. 18). For example, the profile weights of the profile weighting vector for a subgroup of users can be treated similarly to the weights in the weighting vectors of individual users in determining the one or more first items. These one or more first items can be items that are personalized for the subgroup of users. In many embodiments, one or more items, such as the one or more first items, can be selected for each of the plurality of subgroups, which can beneficially predetermine a set of items associated with each subgroup.

In a number of embodiments, method 2200 optionally can include a block 2225 of displaying a listing of the plurality of subgroups to a first user. The first user can be similar or identical to users 350-351 (FIG. 3). In many embodiments, the listing of the plurality of subgroups can be a listing of selectable links in a webpage, which can allow the first user to select one of the subgroups.

Figure 25:
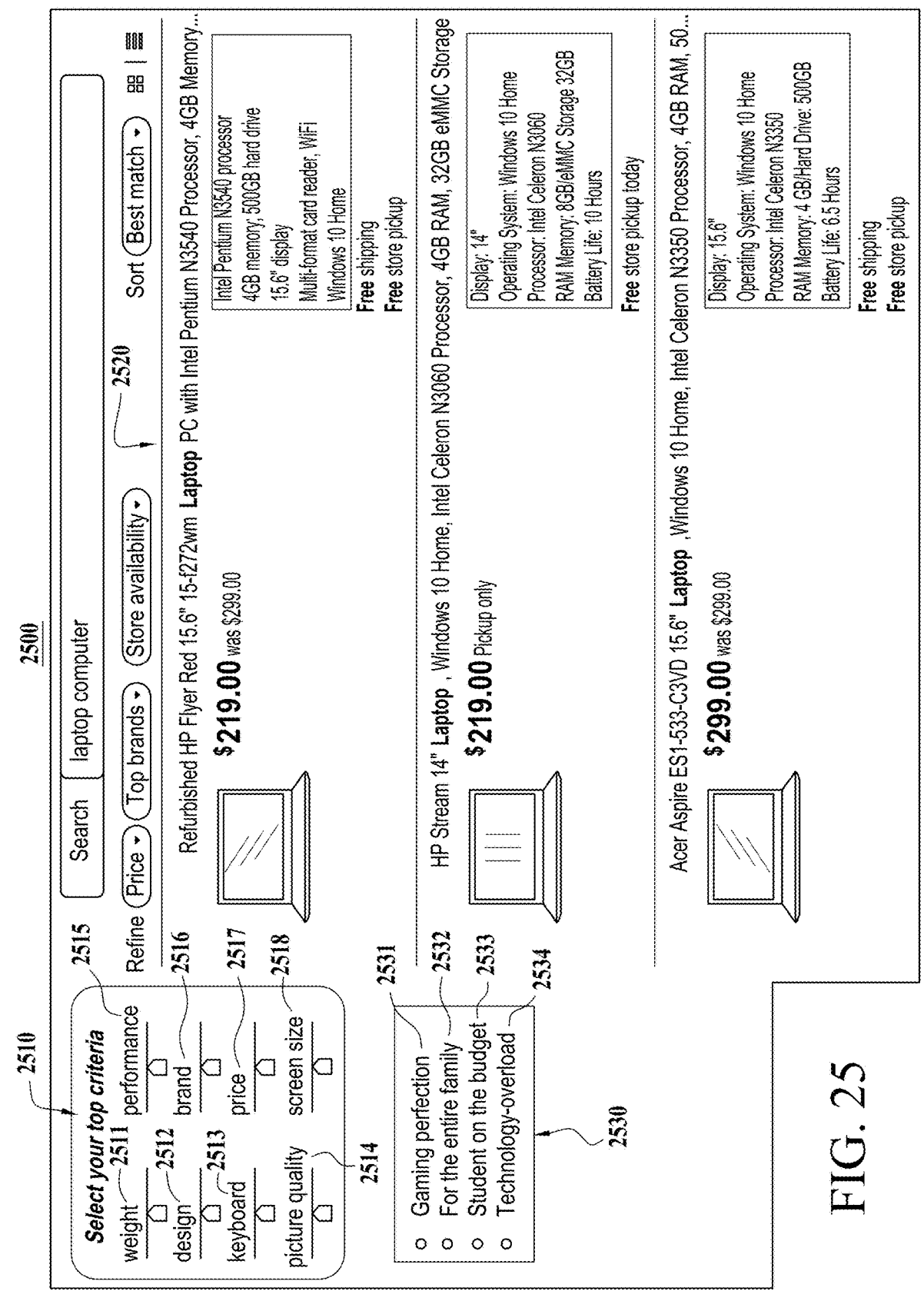
FIG. 25 illustrates a portion of a webpage showing an item results listing for search results for a "laptop computer" search query, along with a smart facet listing, according to an embodiment.

Turning ahead in the drawings, FIG. 25 illustrates a portion of a webpage 2500 showing an item results listing 2520 for search results for a "laptop computer" search query, along with a smart facet listing 2530. Webpage 2500 is merely exemplary, and embodiments for performing customer segmentation and item categorization can be employed in many different embodiments or examples not specifically depicted or described herein. In some embodiments, web server 320 (FIG. 3) can provide a webpage, such as webpage 2500, and/or an app, to one or more of user computers (e.g., 340-341 (FIG. 3)), which can allow a user (e.g., 350-351 (FIG. 3)) to view items selected as a result of the search query and select a smart facet from smart facet listing 2530.

Webpage 2500 can be a result page, and can be similar to webpage 2000 (FIG. 20), webpage 2100 (FIG. 21), and/or webpage 2300 (FIG. 23), and various elements of webpage 2500 can be similar or identical to various elements of webpage 2000 (FIG. 20), webpage 2100 (FIG. 21), and/or 2300 (FIG. 23). In many embodiments, user intent input form 2510 can be similar or identical to user intent input form 1900 (FIG. 19, user intent input form 2010 (FIG. 20), user intent input form 2110 (FIG. 21), and/or user intent input form 2310 (FIG. 23). Item results listing 2520 can be similar to item results listing 2020 (FIG. 20), item results listing 2120 (FIG. 21), and/or item results listing 2320 (FIG. 23). In a number of embodiments, user intent input form 2510 can include input elements 2511-2518, which can be similar to input elements 2011-2018 (FIG. 20), input elements 2111-2118 (FIG. 21), and/or input elements 2311-2318 (FIG. 23).

In many embodiments, webpage 2500 can include smart facet listing 2530, which can include smart facets, such as smart facets 2531-2534. In a number of embodiments, smart facets can be links that operated similarly to facet filters. But unlike facet filters, which filter items on a facet value (e.g., laptop computers with a screen size of 18"-20"), smart filters (e.g., 2531-2534) can instead provide results of items that correspond to subgroups, and which are calculated based on the profile weighting vector in conjunction with the sentiment scores. For example, smart facet 2531 can be named "gaming perfection," and can correspond to a subgroup with a profile weighting vector similar or identical to weighting vector 2412 (FIG. 24). As another example, smart facet 2532 can be named "for the entire family," and can correspond to a subgroup with a profile weighting vector similar or identical to weighting vector 2442 (FIG. 24). As yet another example, smart facet 2533 can be named "student on the budget," and can correspond to a subgroup with a profile weighting vector similar or identical to weighting vector 2422 (FIG. 24). As a further example, smart facet 2534 can be named "technology-overload," and can correspond to a subgroup with a profile weighting vector similar or identical to weighting vector 2432 (FIG. 24). In many embodiments, smart facet listing 2530 can correspond to a listing of the subgroups, and each smart facet (e.g., 2531-2534) can correspond to a subgroup.

Returning to FIG. 22, in several embodiments, method 2200 next can include a block 2230 of receiving from the first user a selection of the first subgroup from among the plurality of subgroups. For example, the first user can click on one of the smart facets (e.g., 2531-2534) in smart facet listing 2530, as shown in FIG. 25, and that selection can be received by system 300 (FIG. 3).

In a number of embodiments, method 2200 further optionally can include a block 2235 of displaying each of the profile weights of the profile weighting vector for the first subgroup. For example, the profile weightings can be displayed in user intent input form 2510 (FIG. 25) by updating the input elements 2511-2518 (FIG. 25) to show the profile weights for the first subgroup. In many embodiments, each of the profile weights of the profile weighting vector can be displayed using a slider, such as the sliders shown in input elements 2511-2518 (FIG. 25). In some embodiments, a weighting vector for the first user can be updated based on the profile weighting vector for the first subgroup, such as updated to match the profile weighting vector, or averaging the weights in the weighting vector for the first user with the profile weighting vector for the first subgroup, for example.

In many embodiments, blocks 2225, 2230, and 2235 can be performed before block 2250, described below.

In other embodiments, method 2200 optionally can include a block 2240 of receiving a weighting vector for a second user. The second user can be similar or identical to users 350-351 (FIG. 3). In several embodiments, the weighing vectors can be generated and/or updated as described above, such as in methods 400 (FIG. 4) and/or 1800 (FIG. 18). For example, the intent weights can be received from the second user through user intent input forms 1900 (FIG. 19), 2010 (FIG. 20), and/or 2110 (FIG. 21). In the same or other embodiments, the weighting vectors can be based at least in part on selections of recommended items received from the second user. For example, the selections can be items selected in a recommendation module, such as recommendation modules 1420 (FIG. 14) and/or 1520 (FIG. 15).

In several embodiments, method 2200 next can include a block 2245 of categorizing the second user into the first subgroup of the plurality of subgroups. In some embodiments, the second user can be categorized into an existing subgroup, such as based on the second user's similarity to one of the subgroups. In many embodiments, the categorization rules applied in block 2210 can be used to categorize the second user into one of the subgroups.

In many embodiments, blocks 2240 and 2245 can be performed before block 2250, described below. In other embodiments, method 2200 can proceed to block 2250, described below, immediately after block 2220.

In several embodiments, method 2200 further can include a block 2250 of displaying the one or more first items for the first subgroup of the plurality of subgroups. For example, as shown in FIG. 23, item results listing 2320 can display the items (e.g., 2321-2323). In some embodiments, the one or more first items for the first subgroup can be displayed in real-time after receiving the selection of the first subgroup in block 2230. For example, if the first user selects a smart facet (e.g., 2531-2534), which corresponds to the first subgroup, the one or more first items selected for the first subgroup in block 2220 can be displayed. As another example, if the second user is categorized into the first subgroup in block 2245, the items in the first subgroup can be displayed to the second user. In several embodiments, displaying the one or more first items for the first subgroup of the plurality of subgroups can include displaying to the second user the one or more first items for the first subgroup.

In some embodiments, the sliders displaying the profile weights can be configured to receive one or more updates from a first user. In many embodiments, the one or more updates can be tracked in a weighting vector for the first user.

In a number of embodiments, method 2200 optionally can include a block 2255 of selecting one or more second items from among a plurality of items based at least in part on: (a) the one or more updates tracked in the weighting vector for the first user, and (b) the sentiment data. In many embodiments, block 2220 can be similar to blocks 415 (FIG. 4), 430 (FIG. 4), 435 (FIG. 4), 1825 (FIG. 18), 1830 (FIG. 18), 1835 (FIG. 18), 1850 (FIG. 18), and/or 2220 (FIG. 22). For example, the updates in the weighting vector can be treated similarly the weighting vector in determining the one or more first items.

In several embodiments, method 2200 additionally can include a block 2260 of displaying the one or more second items to the first user in real-time after receiving the one or more update to the profile weights. In many embodiments, block 2260 can be similar to blocks 1840 (FIG. 18), 1855 (FIG. 18), and/or 2250 (FIG. 22).

In many embodiments, generating and using subgroups for weighting vectors can beneficially create subgroups of users, which can provide personalized item results/recommendations for the subgroup without the processing used to provide personalized item results/recommendations to each user. In some embodiments, generating and using subgroups for weighting vectors can advantageously allow customers to be segmented, and items to be selected for those segments, in real-time, and customer intent/preferences can be determined in real-time. In a number of embodiments, the smart facets can allow a user to readily input preferences by type without inputting each of the relevant intent weights, which can provide users a better buying experience.

Figure 26:
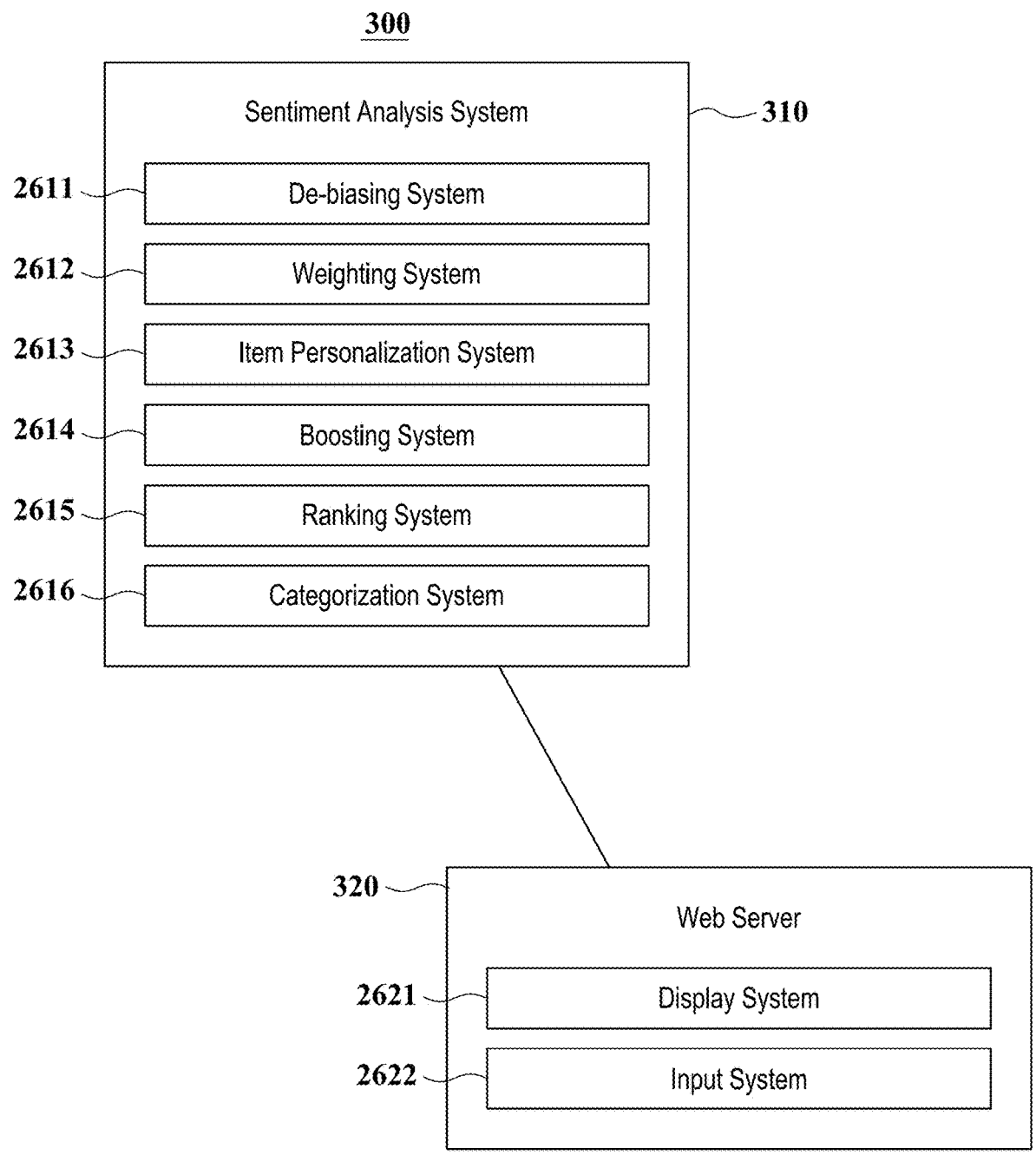
FIG. 26 illustrates a block diagram of the system of FIG. 3.

Turning ahead in the drawings, FIG. 26 illustrates a block diagram of system 300, according to the embodiment shown in FIG. 3. Sentiment analysis system 310 and web server 320 are merely exemplary and are not limited to the embodiments presented herein. Sentiment analysis system 310 and web server 320 can be employed in many different embodiments or examples not specifically depicted or described herein. In some embodiments, certain elements or system of sentiment analysis system 310 and/or web server 320 can perform various procedures, processes, and/or acts. In other embodiments, the procedures, processes, and/or acts can be performed by other suitable elements or systems. In many embodiments, the system of sentiment analysis system 310 and/or web server 320 can be modules of computing instructions (e.g., software modules) stored at non-transitory computer readable media. In other embodiments, the systems of sentiment analysis system 310 and/or web server 320 can be implemented in hardware.

In many embodiments, sentiment analysis system 310 can include a de-biasing system 2611. In certain embodiments, de-biasing system 2611 can at least partially perform block 405 (FIG. 4) of applying de-biasing rules to normalize sentiment scores for a plurality of features for items in a category of items; and/or block 1805 (FIG. 18) of, before selecting the one or more first items, applying de-biasing rules to normalize the sentiment scores for the features for the plurality of items.

In a number of embodiments, sentiment analysis system 310 can include a weighting system 2612. In certain embodiments, weighting system 2612 can at least partially perform block 410 (FIG. 4) of generating a weighting vector for a first user; block 425 (FIG. 4) of updating the weight that corresponds to each of the one or more first features for the new selected item in the weighting vector for the first user; block 1820 (FIG. 18) of updating a weighting vector for the first user based on the intent weights for the plurality of features received from the first user; block 2205 (FIG. 22) of receiving a weighting vector for each of a plurality of users; block 2215 (FIG. 22) of generating a profile weighting vector for each subgroup of the plurality of subgroups; and/or block 2240 (FIG. 22) of receiving a weighting vector for a second user.

In many of embodiments, sentiment analysis system 310 can include an item personalization system 2613. In certain embodiments, item personalization system 2613 can at least partially perform block 415 (FIG. 4) of, in response to receiving a request from the first user to view details for a selected item, recommending to the first user, in real-time after receiving the request, one or more other items that are different from the selected item; block 1825 (FIG. 18) of selecting one or more first items from among a plurality of items in the category of items based at least in part on: (a) the intent weights for the plurality of features for the first user, and (b) sentiment data comprising a sentiment score for each feature for each of the plurality of items; block 1850 (FIG. 18) of selecting one or more second items from among a plurality of items based at least in part on: (a) the update to the intent weights for the plurality of features for the first user, and (b) the sentiment data; block 2220 (FIG. 22) of selecting, for a first subgroup of the plurality of subgroups, one or more first items from among a plurality of items in the category of items based at least in part on: (a) the profile weights of the profile weighting vector for the first subgroup, and (b) sentiment data comprising a sentiment score for each feature for each of the plurality of items; and/or block 2255 (FIG. 22) of selecting one or more second items from among a plurality of items based at least in part on: (a) the one or more updates tracked in the weighting vector for the first user, and (b) the sentiment data.

In a number of embodiments, sentiment analysis system 310 can include a boosting system 2614. In certain embodiments, boosting system 2614 can at least partially perform block 430 (FIG. 4) of generating, for each item in the category of items, an item boosting signal for the first user based on a dot product of the weighting vector and a score vector representing the sentiment scores for the plurality of features for the item; and/or block 1830 (FIG. 18) of generating, for each item of the plurality of items, an item boosting signal for the first user based on a dot product of the weighting vector and a score vector representing the sentiment scores for the plurality of features for the item.

In many of embodiments, sentiment analysis system 310 can include a ranking system 2615. In certain embodiments, ranking system 2615 can at least partially perform block 435 (FIG. 4) of generating updated ranking scores for each item in the category of items for the first user based on the item boosting signal for the item; and/or block 1835 (FIG. 4) of generating updated ranking scores for each item in the plurality of items based on the item boosting signal for the item for the first user In a number of embodiments, sentiment analysis system 310 can include a categorization system 2616. In certain embodiments, categorization system 2616 can at least partially perform block 2210 (FIG. 22) of applying categorization rules on the weighting vectors for the plurality of users to categorize the plurality of users into a plurality of subgroups; and/or block 2245 (FIG. 22) of categorizing the second user into the first subgroup of the plurality of subgroups.

In several embodiments, web server 320 can include a display system 2621. In certain embodiments, display system 2621 can at least partially perform block 415 (FIG. 4) of, in response to receiving a request from the first user to view details for a selected item, recommending to the first user, in real-time after receiving the request, one or more other items that are different from the selected item; block 440 (FIG. 4) of displaying a list of item results to the first user; block 1810 (FIG. 18) of sending to a first user an input form comprising an input element for an intent weight for each of a plurality of features; block 1840 (FIG. 18) of displaying the one or more first items to the first user in real-time after receiving the intent weights; block 1855 (FIG. 18) of displaying the one or more second items to the first user in real-time after receiving the update to the intent weights; block 2225 (FIG. 22) of displaying a listing of the plurality of subgroups to a first user; block 2235 (FIG. 22) of displaying each of the profile weights of the profile weighting vector for the first subgroup; block 2250 (FIG. 22) of displaying the one or more first items for the first subgroup of the plurality of subgroups; and/or block 2260 (FIG. 22) of displaying the one or more second items to the first user in real-time after receiving the one or more update to the profile weights.

In many embodiments, the act of "displaying" can involve displaying on a local system, or sending information to be displayed on a remote system, such as sending information from web server 320 to a user computer (e.g., 340-341 (FIG. 3)) to be displayed on the user computer (e.g., 340-341 (FIG. 3)). For example, the information can be encoded for display in a web browser and/or an app on the user computer (e.g., 340-341 (FIG. 3)). Moreover, "displaying" can encompass both sending a new webpage and/or app screen and sending an update to at least a portion of a webpage and/or app screen.

In a number of embodiments, web server 320 can include an input system 2622. In certain embodiments, input system 2622 can at least partially perform block 415 (FIG. 4) of, in response to receiving a request from the first user to view details for a selected item, recommending to the first user, in real-time after receiving the request, one or more other items that are different from the selected item; block 420 (FIG. 4) of receiving a new request from the first user to view details for a new selected item that is selected from among the one or more other items; block 1815 (FIG. 18) of receiving from the first user the intent weights for the plurality of features; block 1845 (FIG. 18) of receiving from the first user an update to the intent weights for the plurality of features; and/or block 2230 (FIG. 22) of receiving from the first user a selection of the first subgroup from among the plurality of subgroups.

Although providing recommendations based on user-generated post-purchase content and navigation patterns, providing recommendations based on user intent and user-generated post-purchase content, and performing customer segmentation and item categorization have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-26 may be modified, and that the foregoing discussion of certain of these embodiments does not necessarily represent a complete description of all possible embodiments. For example, one or more of the procedures, processes, or activities of FIGS. 4, 18, and 22 may include different procedures, processes, and/or activities and be performed by many different system, in many different orders. As another example, one or more of the procedures, processes, and/or activities of one of FIG. 4, 18, or 22 can be performed in another one of FIG. 4, 18, or 22. As another example, the modules within sentiment analysis system 310 and web server 320 in FIG. 26 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
  one or more processors; and
  one or more non-transitory computer-readable media storing computing instructions configured to run on the one or more processors and perform:
    receiving a respective weighting vector for each of a plurality of users;
    applying categorization rules on the respective weighting vectors for the plurality of users to categorize the plurality of users into a plurality of subgroups;
    generating a profile weighting vector for a first subgroup of the plurality of subgroups;
    selecting, for the first subgroup, one or more first items from among a plurality of items in a category of items based at least in part on: (a) profile weights of the profile weighting vector for the first subgroup, and (b) sentiment data for features of the plurality of items; and
    displaying the one or more first items for the first subgroup of the plurality of subgroups.

2. The system of claim 1, wherein the computing instructions are further configured to perform, before displaying the one or more first items for the first subgroup:
  displaying a listing of the plurality of subgroups to a first user of the plurality of users; and
  receiving from the first user a selection of the first subgroup from among the plurality of subgroups,
  wherein:
    the one or more first items for the first subgroup are displayed in real-time after receiving the selection of the first subgroup.

3. The system of claim 2, wherein the computing instructions are further configured to perform:
  displaying each of the profile weights of the profile weighting vector for the first subgroup.

4. The system of claim 3, wherein:
  each of the profile weights of the profile weighting vector is displayed using a respective slider;
  the respective sliders displaying the profile weights are configured to receive one or more updates from the first user; and the one or more updates are tracked in a weighting vector for the first user.

5. The system of claim 4, wherein the computing instructions are further configured to perform:
- selecting one or more second items from among the plurality of items based at least in part on: (a) the one or more updates tracked in the weighting vector for the first user, and (b) the sentiment data; and
- displaying the one or more second items to the first user in real-time after receiving the one or more updates to the profile weights.

6. The system of claim 1, wherein:
the categorization rules comprise performing clustering.

7. The system of claim 1, wherein:
the categorization rules comprise performing supervised classification.

8. The system of claim 1, wherein:
the respective weighting vectors for at least a portion of the plurality of users are based at least in part on intent weights received from the portion of the plurality of users.

9. The system of claim 1, wherein:
the respective weighting vectors for at least a portion of the plurality of users are based at least in part on selections of recommended items received from the portion of the plurality of users.

10. The system of claim 1, wherein the computing instructions are further configured to perform, before displaying the one or more first items for the first subgroup:
- receiving a weighting vector for a second user; and
- categorizing the second user into the first subgroup of the plurality of subgroups,
wherein:
- displaying the one or more first items for the first subgroup of the plurality of subgroups comprises displaying to the second user the one or more first items for the first subgroup.

11. A method being implemented via execution of computing instructions configured to run at one or more processors and configured to be stored at non-transitory computer-readable media, the method comprising:
- receiving a respective weighting vector for each of a plurality of users;
- applying categorization rules on the respective weighting vectors for the plurality of users to categorize the plurality of users into a plurality of subgroups;
- generating a profile weighting vector for a first subgroup of the plurality of subgroups;
- selecting, for the first subgroup, one or more first items from among a plurality of items in a category of items based at least in part on: (a) profile weights of the profile weighting vector for the first subgroup, and (b) sentiment data for features of the plurality of items; and
- displaying the one or more first items for the first subgroup of the plurality of subgroups.

12. The method of claim 11 further comprising, before displaying the one or more first items for the first subgroup:
- displaying a listing of the plurality of subgroups to a first user of the plurality of users; and
- receiving from the first user a selection of the first subgroup from among the plurality of subgroups,
wherein:
the one or more first items for the first subgroup are displayed in real-time after receiving the selection of the first subgroup.

13. The method of claim 12 further comprising:
displaying each of the profile weights of the profile weighting vector for the first subgroup.

14. The method of claim 13, wherein:
- each of the profile weights of the profile weighting vector is displayed using a respective slider;
- the respective sliders displaying the profile weights are configured to receive one or more updates from the first user; and
- the one or more updates are tracked in a weighting vector for the first user.

15. The method of claim 14 further comprising:
- selecting one or more second items from among the plurality of items based at least in part on: (a) the one or more updates tracked in the weighting vector for the first user, and (b) the sentiment data; and
- displaying the one or more second items to the first user in real-time after receiving the one or more updates to the profile weights.

16. The method of claim 11, wherein:
the categorization rules comprise performing clustering.

17. The method of claim 11, wherein:
the categorization rules comprise performing supervised classification.

18. The method of claim 11, wherein:
the respective weighting vectors for at least a portion of the plurality of users are based at least in part on intent weights received from the portion of the plurality of users.

19. The method of claim 11, wherein:
the respective weighting vectors for at least a portion of the plurality of users are based at least in part on selections of recommended items received from the portion of the plurality of users.

20. The method of claim 11 further comprising, before displaying the one or more first items for the first subgroup:
- receiving a weighting vector for a second user; and
- categorizing the second user into the first subgroup of the plurality of subgroups,
wherein:
- displaying the one or more first items for the first subgroup of the plurality of subgroups comprises displaying to the second user the one or more first items for the first subgroup.

* * * * *